US010750049B2

(12) United States Patent
Yamada

(10) Patent No.: US 10,750,049 B2
(45) Date of Patent: Aug. 18, 2020

(54) NON-TRANSITORY COMPUTER-READABLE INFORMATION RECORDING MEDIUM, INFORMATION PROCESSING APPARATUS, AND COMMUNICATIONS SYSTEM

(71) Applicant: Tsuyoshi Yamada, Kanagawa (JP)

(72) Inventor: Tsuyoshi Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/705,433

(22) Filed: Sep. 15, 2017

(65) Prior Publication Data
US 2018/0020120 A1 Jan. 18, 2018

Related U.S. Application Data

(63) Continuation of application No. 15/047,801, filed on Feb. 19, 2016, now Pat. No. 9,800,762.

(30) Foreign Application Priority Data

Mar. 3, 2015 (JP) .................................. 2015-041083
Jan. 29, 2016 (JP) .................................. 2016-015568

(51) Int. Cl.
*H04N 1/44* (2006.01)
*H04W 76/14* (2018.01)
(Continued)

(52) U.S. Cl.
CPC ......... *H04N 1/4406* (2013.01); *G06F 21/608* (2013.01); *H04W 4/80* (2018.02);
(Continued)

(58) Field of Classification Search
CPC .... H04N 1/4406; H04W 76/14; H04W 76/18; H04W 4/80; H04W 12/06; H04W 84/12; G06F 21/608
(Continued)

(56) References Cited

U.S. PATENT DOCUMENTS 7,334,013 B1 2/2008 Calinov et al.
8,495,131 B2 7/2013 Ahuja et al.
(Continued)

FOREIGN PATENT DOCUMENTS

CN 103369637 10/2013
CN 104767837 * 7/2015 ......... H04L 43/0852
(Continued)

OTHER PUBLICATIONS

Extended European Search Report dated Jul. 8, 2016 in EP Application No. 16157392.8 filed on Feb. 25, 2016.
(Continued)

*Primary Examiner* — Jerome Grant, II
(74) *Attorney, Agent, or Firm* — IPUSA, PLLC

(57) ABSTRACT

An information processing apparatus requests, via one of networks, an apparatus to carry out process, the apparatus being connectable to the networks; receives identification information that is used to identify a user; acquires sets of the communications information that includes a first set of the communications information to be used to connect to the apparatus via a first network of the networks; determines, based on the identification information, whether to use the first network to request the apparatus to carry out the process; when determining to use the first network to request the apparatus to carry out the process, switch a second network of the networks used to carry out communications, to the first network to be used to carry out communications, the second network being different from the first network; and requests, via the first network, the apparatus to carry out the process.

14 Claims, 26 Drawing Sheets

(51) Int. Cl.
  *H04W 76/18* (2018.01)
  *H04W 4/80* (2018.01)
  *G06F 21/60* (2013.01)
  *H04W 12/06* (2009.01)
  *H04W 84/12* (2009.01)

(52) U.S. Cl.
  CPC ........... *H04W 12/06* (2013.01); *H04W 76/14* (2018.02); *H04W 76/18* (2018.02); *H04W 84/12* (2013.01)

(58) Field of Classification Search
  USPC ........................................................ 358/1.14
  See application file for complete search history.

(56) References Cited

U.S. PATENT DOCUMENTS

| | | | |
|---|---|---|---|
| 8,798,542 | B2 | 8/2014 | Oba et al. |
| 2002/0156906 | A1* | 10/2002 | Kadyk ................ H04L 63/0281 709/229 |
| 2006/0092455 | A1 | 5/2006 | Maeda et al. |
| 2008/0071907 | A1 | 3/2008 | Thompson |
| 2008/0117847 | A1 | 5/2008 | Hamada |
| 2008/0229025 | A1 | 9/2008 | Plamondon |
| 2009/0013324 | A1 | 1/2009 | Gobara et al. |
| 2009/0092142 | A1* | 4/2009 | Kreiner .................. H04L 12/66 370/401 |
| 2012/0011567 | A1* | 1/2012 | Cronk .................. H04L 63/102 726/4 |
| 2013/0260683 | A1 | 10/2013 | Suzuki et al. |
| 2013/0309968 | A1 | 11/2013 | Suzuki |
| 2014/0036793 | A1* | 2/2014 | Johnsson ............. H04W 76/11 370/329 |
| 2014/0068714 | A1 | 3/2014 | Ono et al. |
| 2014/0118778 | A1 | 5/2014 | Lee et al. |
| 2014/0240776 | A1 | 8/2014 | Suzuki et al. |
| 2015/0020169 | A1* | 1/2015 | Mori ...................... H04L 67/02 726/4 |
| 2015/0029540 | A1 | 1/2015 | Jo et al. |
| 2015/0082222 | A1 | 3/2015 | Yamada |
| 2015/0204558 | A1 | 7/2015 | Sartain et al. |
| 2015/0304805 | A1 | 10/2015 | Suzuki et al. |
| 2015/0350208 | A1* | 12/2015 | Bayramkul ............. G06F 21/34 726/9 |
| 2015/0355874 | A1 | 12/2015 | Kamoi |
| 2016/0020981 | A1 | 1/2016 | Raney |
| 2016/0026414 | A1 | 1/2016 | Sako |
| 2016/0064498 | A1 | 3/2016 | Liu |
| 2016/0092149 | A1 | 3/2016 | Nojima |
| 2016/0119306 | A1 | 4/2016 | Matthews et al. |
| 2016/0142581 | A1 | 5/2016 | Morita |
| 2016/0224289 | A1 | 8/2016 | Yamanaka et al. |
| 2016/0227353 | A1 | 8/2016 | Sueyoshi et al. |
| 2016/0241534 | A1 | 8/2016 | Eld et al. |
| 2016/0241728 | A1 | 8/2016 | Naruse |
| 2016/0295062 | A9 | 10/2016 | King et al. |
| 2017/0208431 | A1 | 7/2017 | Suzuki et al. |
| 2018/0203988 | A1* | 7/2018 | Hamlin .................... G06F 21/36 |
| 2018/0206117 | A1* | 7/2018 | Stahl ................... H04L 63/0823 |
| 2018/0212957 | A1* | 7/2018 | Lee .......................... G06F 21/31 |
| 2018/0359634 | A1* | 12/2018 | Yamamoto ............ H04W 12/06 |
| 2019/0052636 | A1* | 2/2019 | Wang ..................... H04L 9/3242 |
| 2019/0146557 | A1* | 5/2019 | Choi ..................... G06F 1/1652 361/749 |
| 2019/0182050 | A1* | 6/2019 | Famechon ............ H04L 9/3247 |
| 2019/0272361 | A1* | 9/2019 | Kursun ................. G06F 16/337 |
| 2019/0288851 | A1* | 9/2019 | Muhanna ............. H04L 9/3242 |

FOREIGN PATENT DOCUMENTS

| | | | | |
|---|---|---|---|---|
| EP | 2234425 | | 9/2010 | |
| GB | 2474300 | * | 4/2011 | ............... G06F 3/12 |
| JP | 5121212 | | 1/2013 | |
| JP | 2013-239906 | | 11/2013 | |
| JP | 2014-027384 | | 2/2014 | |
| WO | WO2014000640 | * | 3/2014 | ............ H04W 36/14 |

OTHER PUBLICATIONS

Office Action dated Mar. 2, 2018 issued with respect to the corresponding Chinese Patent Application No. 201610109618.0.
Japanese Office Action for 2016-015568 dated Jul. 23, 2019.
Indian Office Action for 201634006583 dated Nov. 26, 2019.

* cited by examiner

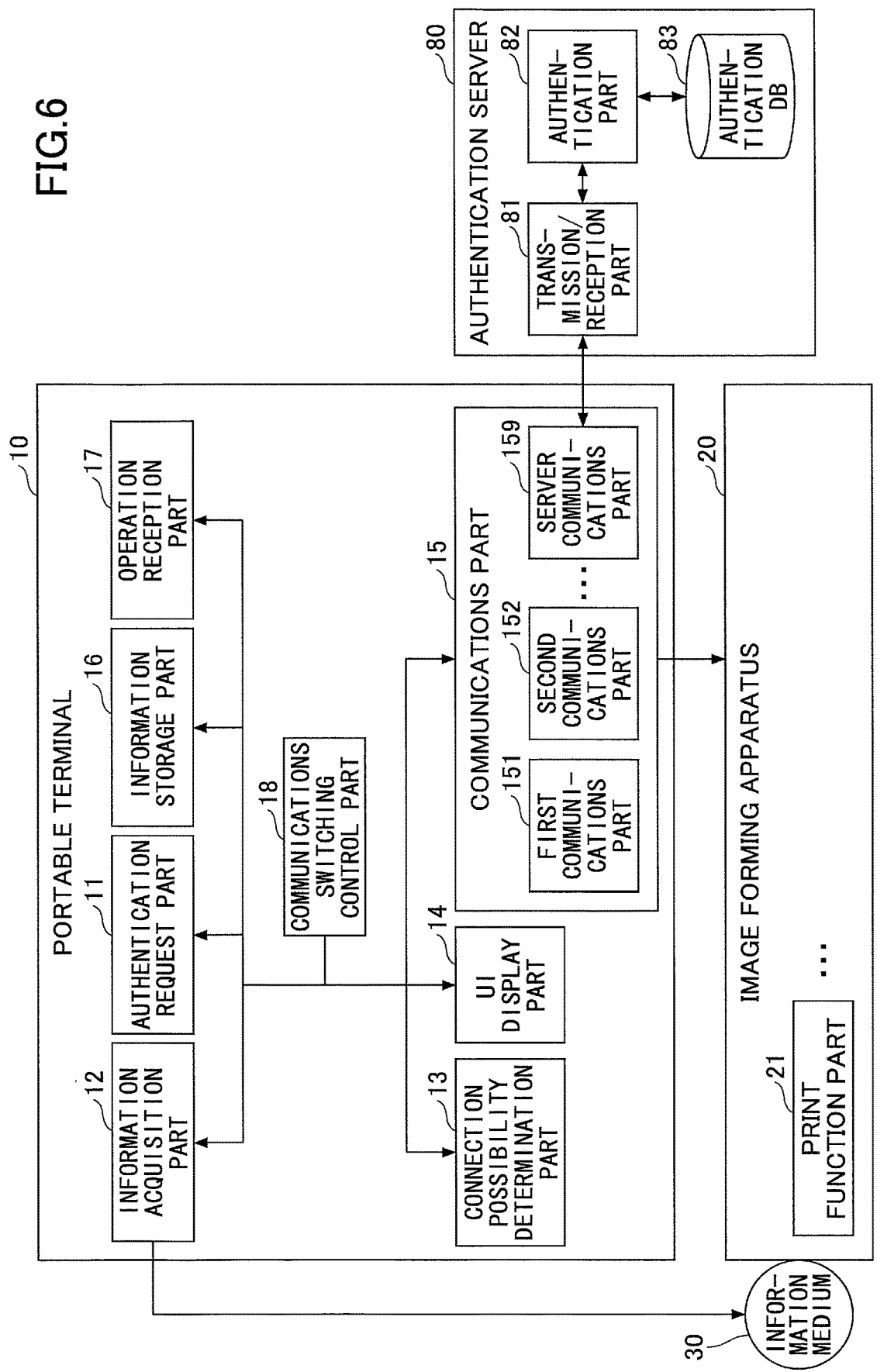

FIG.7A

| ITEM NAME | ITEM VALUE | |
|---|---|---|
| AUTHENTICATION SERVER IP ADDRESS | 192.168.0.100 | ⎫ 900 |
| SSL COMMUNICATIONS | Yes | |
| ... | | |
| FIRST IP ADDRESS | 192.168.20.1 | |
| SSL COMMUNICATIONS | Yes | |
| SSID | ABC123 | |
| ENCRYPTION METHOD | WPA/WPA-2PSK | 1100 |
| PASSWORD | **** | |
| HTTP PORT NUMBER | 80 | |
| HTTPS PORT NUMBER | 443 | |
| NETWORK N2 AVAILABILITY | Yes | 1200 |
| SECOND IP ADDRESS | 192.160.0.3 | |
| SSID | 456DEF | |
| ENCRYPTION METHOD | WPA/WPA2-PSK | |
| PASSWORD | ****** | 1300 |
| HTTP PORT NUMBER | 80 | |
| HTTPS PORT NUMBER | 443 | |
| ... | | |

(Table 1000)

FIG.13

| PRIORITY | ITEM NAME | ITEM VALUE | |
|---|---|---|---|
| – | AUTHENTICATION SERVER IP ADDRESS | 192.168.0.100 | ⎫ |
| | SSL COMMUNICATIONS | Yes | ⎬ 900 |
| | ... | | ⎭ |
| 1 | FIRST IP ADDRESS | 192.168.20.1 | ⎫ |
| | SSL COMMUNICATIONS | Yes | |
| | SSID | ABC123 | |
| | ENCRYPTION METHOD | WPA/WPA-2PSK | ⎬ 1100 |
| | PASSWORD | **** | |
| | HTTP PORT NUMBER | 80 | |
| | HTTPS PORT NUMBER | 443 | ⎭ |
| 2 | NETWORK N2 AVAILABILITY | Yes | ⎬ 1200 |
| | SECOND IP ADDRESS | 192.160.0.3 | ⎫ |
| | SSID | 123ABC | |
| | ENCRYPTION METHOD | WPA/WPA2-PSK | |
| | PASSWORD | ****** | ⎬ 1300 |
| | HTTP PORT NUMBER | 80 | |
| | HTTPS PORT NUMBER | 443 | |
| | ... | | ⎭ |

NON-TRANSITORY COMPUTER-READABLE INFORMATION RECORDING MEDIUM, INFORMATION PROCESSING APPARATUS, AND COMMUNICATIONS SYSTEM

CROSS-REFERENCE TO RELATED APPLICATIONS

The present application is a continuation application of U.S. patent application Ser. No. 15/047,801, and is based on and claims the benefit of priority to Japanese Priority Application No. 2015-041083, filed on Mar. 3, 2015, and Japanese Priority Application No. 2016-015568, filed on Jan. 29, 2016, the entire contents of which are hereby incorporated herein by reference.

BACKGROUND

1. Technical Field

The present disclosure relates to a non-transitory computer-readable information recording medium, an information processing apparatus, and a communications system.

2. Description of the Related Art

It is convenient for a user if the user carrying a terminal can connect the terminal to an apparatus such as an image forming apparatus wirelessly, and use the apparatus, because no wired connection is needed. However, in many cases, a wireless communications parameter or such is needed to be set to the terminal for wirelessly communicating with the apparatus. A work to set such a wireless communications parameter to the terminal may be not necessarily easy for the user.

A technology has been known to set a wireless communications parameter to a terminal without the need of user setting or with a minimized user setting (for example, see Japanese Patent No. 5121212 (Patent Reference No. 1)). Patent Reference No. 1 discloses a management apparatus which, for enabling a wireless connection of a wireless communications unit to the same apparatus using different wireless communications parameters, reads information stored in the user's Near Field Communication (NFC) chip, and sets a wireless communications parameter for a case where the user is at home or another wireless communications parameter for a case where the user is outside, depending on the read information.

SUMMARY

According to one aspect, a non-transitory computer-readable information recording medium stores a program. The program is configured to cause at least one processor installed in an information processing apparatus to request, via one of a plurality of networks, an apparatus to carry out a process, the apparatus being connectable to the plurality of networks; receive identification information that is used to identify a user; acquire a plurality of sets of communications information that includes a first set of communications information to be used to connect to the apparatus via a first network of the networks; determine, based on the identification information, whether to use the first network to request the apparatus to carry out the process; when determining to use the first network to request the apparatus to carry out the process, switch a second network of the networks, which is used to carry out communications, to the first network to be used to carry out communications, the second network being different from the first network; and request, via the first network, the apparatus to carry out the process.

Other objects, features, and advantages will become more apparent from the following detailed description when read in conjunction with the accompanying drawings.

BRIEF DESCRIPTION OF THE DRAWINGS

FIG. 6 is a functional block diagram of one example of the printing system;

FIGS. 7A and 7B illustrate examples of communications information;

FIG. 13 illustrates another example of the communications information;

DETAILED DESCRIPTION OF EMBODIMENTS

According to the above-mentioned wireless communications parameter setting method disclosed in Patent Reference No. 1, unnecessary communications may occur. For example, when the terminal is connectable to a plurality of networks, unnecessary communications may occur if the user erroneously selects a wireless communications parameter different from a proper one. When the terminal has been connected to a certain network, further unnecessary communications may occur if the terminal automatically tries to connect to a target apparatus via the currently used network which is not a proper one to connect to the target apparatus.

In more detail, a case will now be assumed where an image forming apparatus is connected to an employee network dedicated for the employees and a visitor network to be used by visitors. Generally speaking, a visitor is not allowed to use the employee network. The employee is expected to use the employee network separated from the outside to carry out communications with a target apparatus, instead of the visitor network. That is, the user is expected to connect to the image forming apparatus using the proper network. If a NFC chip stores a wireless communications parameter for each network, a terminal carried by the user reads the wireless communications parameter from the NFC chip, and sets it to the terminal. However, if the user has a plurality of available wireless communications parameters, it may be difficult for the user to select the proper one from these wireless communications parameters.

Also, if the user is an employee and the user selects the employee wireless communications parameter, the user cannot connect to the image forming apparatus when the terminal is connected to a network such as 3G, LTE, or the like, other than the employee network. In this case, the terminal may try to connect to the image forming apparatus via the network currently connected such as 3G, LTE, or the like. If so, useless communications may occur.

The present disclosure is advantageous for the above-mentioned situation, and has an object to provide a program configured to, when a terminal or the like transmits a request to an apparatus which is connectable to a plurality of networks, connect to a proper one of the plurality of networks.

Below, embodiments will be described with reference to the accompanying drawings.

<Use Cases Expected for a Printing System According to a First Embodiment>

Figure 1A:
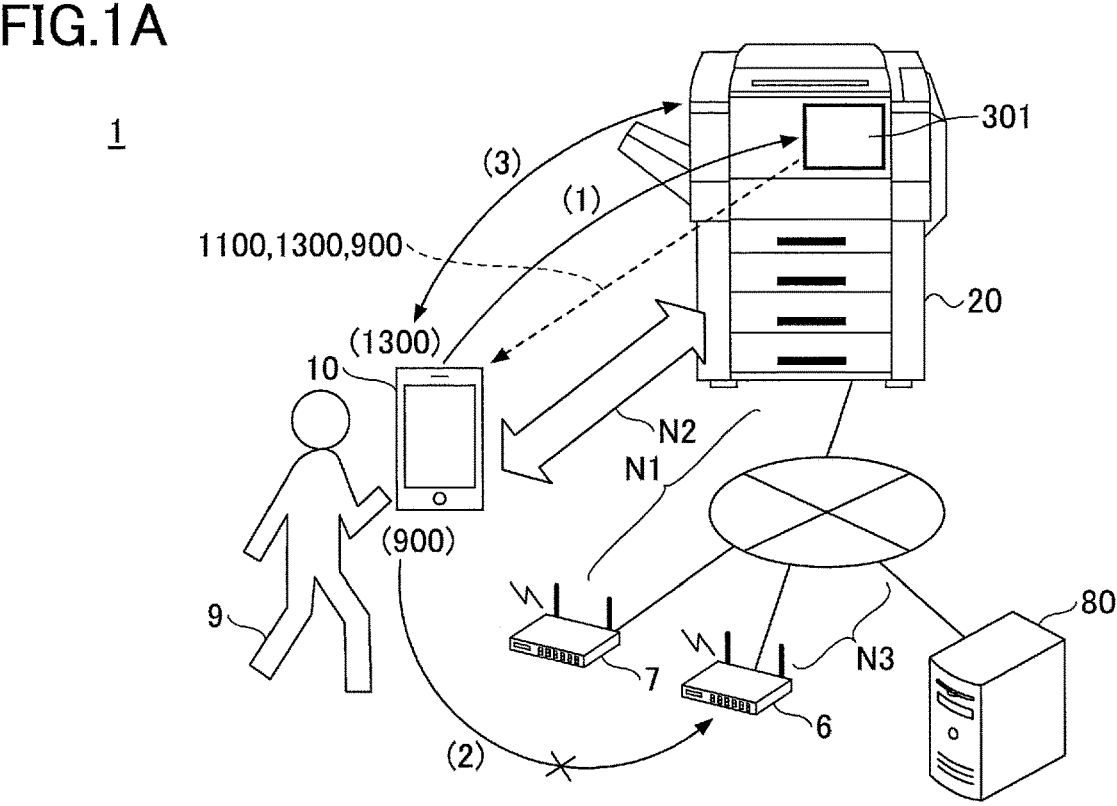
FIGS. 1A and 1B illustrate examples of use cases expected for a printing system according to a first embodiment.
Figure 1B:
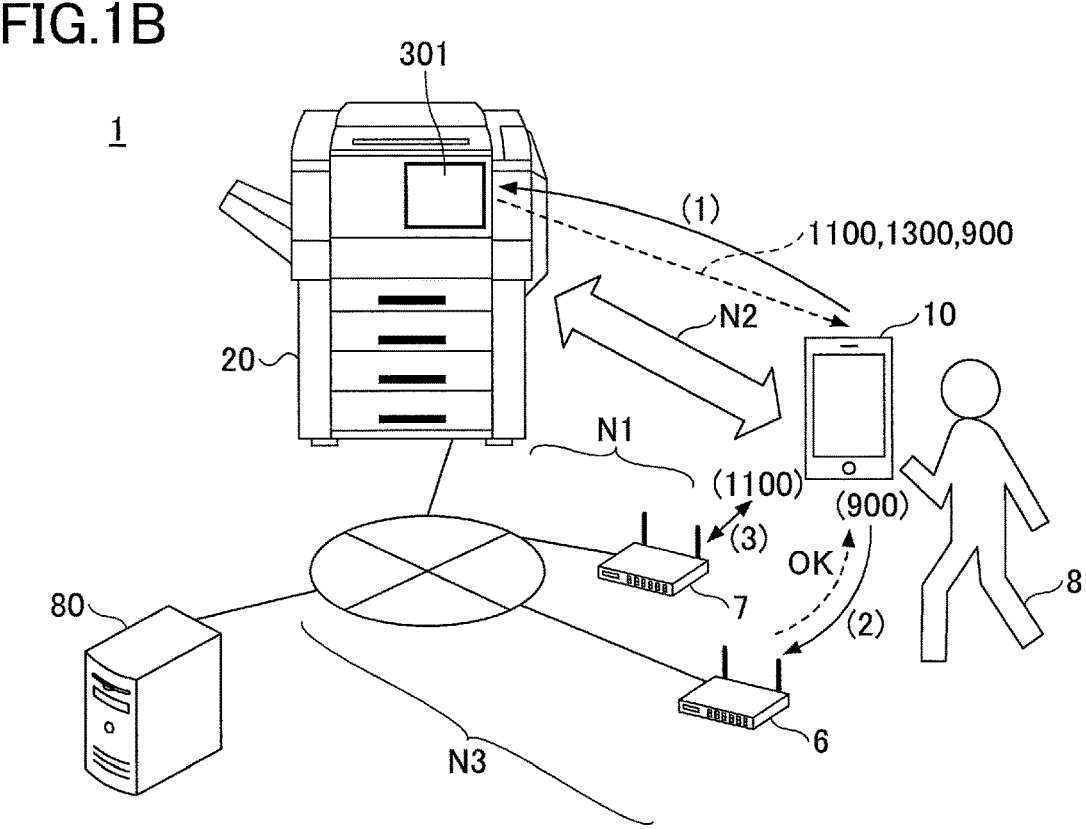

First, with reference to FIGS. 1A and 1B, use cases expected for a printing system 1 according to a first embodiment will be described. FIGS. 1A and 1B illustrate examples of use cases expected for a printing system according to a first embodiment. An image forming apparatus 20 is connected to a network N1 corresponding to an intracompany LAN, or the like. The image forming apparatus 20 can carry out communications of so-called P2P (Peer to Peer) using a network N2. An authentication server 80 (one example of an authentication unit) is connected to a network N3 connectable to the Internet. The network N1 has an access point 7 for wireless communications.

Use Case 1

In a use case 1, a visitor 9 uses his or her own portable terminal 10, and wirelessly carries out communications with the image forming apparatus 20 for performing printing or the like. A description will now be made with reference to FIG. 1A.

(1) First, the visitor 9 holds the portable terminal 10 at a position near a short-range wireless communications unit 301 (described later) of the image forming apparatus 20, or puts the portable terminal 10 over the short-range wireless communications unit 301. As a result, the portable terminal 10 acquires first communications information 1100 for connecting to the image forming apparatus 20 via the network N1, second communications information 1300 for connecting to the image forming apparatus 20 via the network N2, and authentication connection information 900 for connecting to the authentication server 80 via the network N3.

(2) Then, the portable terminal 10 of the visitor 9 connects to the authentication server 80 using the authentication connection information 900. However, the portable terminal 10 of the visitor 9 cannot receive the user's input of valid authentication information (an employee ID and a password) for connecting to the image forming apparatus 20 via the network N1. Therefore, the portable terminal 10 of the visitor 9 cannot be authenticated by the authentication server 80.

(3) Because of not being able to be authenticated, the portable terminal 10 of the visitor 9 tries to carry out communications using the second communications information 1300. By using the second communications information 1300, the portable terminal 10 of the visitor 9 can carry out communications with the image forming apparatus 20. Thus, the portable terminal 10 of the visitor 9 starts communications with the image forming apparatus 20 via the network N2.

Thus, the portable terminal 10 of the visitor 9 can carry out communications with the image forming apparatus 20 without using the network N1 that is the intracompany LAN. Even if the portable terminal 10 of the visitor 9 can connect to the network N3, the portable terminal 10 of the visitor 9 cannot be authenticated by the authentication server 80, and thus, cannot connect to the image forming apparatus 20 via the network N1. Thus, it is possible to limit, with the authentication server 80, the way of connection by the visitor 9 to the network N2.

Use Case 2

In a use case 2, an employee 8 carries out communications wirelessly with the image forming apparatus 20 using his or her own portable terminal 10 for performing printing or the like. In this case, the image forming apparatus 20 belongs to another division and the employee 8 does not normally use the image forming apparatus 20. A description will now be made with reference to FIG. 1B.

(1) First, the employee 8 holds the portable terminal 10 near or puts it over the short-range wireless communications unit 301 of the image forming apparatus 20. Thereby, the portable terminal 10 acquires the first communications information 1100 for communications via the network N1, the second communications information 1300 for communications via the network N2, and, the authentication connection information 900 for connecting to the authentication server 80 via the network N3.

(2) Then, the portable terminal 10 of the employee 8 uses the authentication connection information 900 to connect to the authentication server 80, and transmits an authentication request together with authentication information (an employee ID and a password). If the proper authentication information is transmitted, the portable terminal 10 of the employee 8 can be authenticated (authentication success) by the authentication server 80.

(3) In the case of authentication success, the portable terminal 10 of the employee 8 tries communications using the first communications information 1100. Because the portable terminal 10 of the employee 8 has an authority to connect to the network N1, the portable terminal 10 of the employee 8 can connect to the intracompany LAN via the access point 7, and carry out communications using the first communications information 1100. Thus, the portable terminal 10 starts communications with the image forming apparatus 20 via the network N1.

Thus, the portable terminal 10 of the employee 8 can be authenticated via the network N3 that is the intracompany LAN, and carry out communications with the image forming apparatus 20 via the network N1 that is the intracompany LAN. If the portable terminal 10 of the employee 8 cannot be authenticated or cannot connect to the image forming apparatus 20 via the network N1, also the portable terminal 10 of the employee 8 can connect to the image forming apparatus 20 via the network N2. In this case, the portable terminal 10 of the employee 8 can carry out printing or the like temporarily using the network N2.

Thus, according to the printing system 1 of the first embodiment, it is possible to reduce the user's work to set the communications information, and also, visitors 9 and employees 8 can automatically select the proper networks, respectively.

Terms

An "employee" is one of actual examples of the user of the portable terminal 10 and the image forming apparatus 20, and has an authority to connect to the intracompany LAN (i.e., his or her portable terminal 10 has the wireless communications parameter for connecting to the intracompany LAN previously set therein). This user can be called, also other than "employee 8", "staff member", "office worker", "office staff", or the like.

A "visitor" is another one of actual examples of the user of the portable terminal 10 and the image forming apparatus 20, and is the user who does not have an authority to connect to the intracompany LAN. All the users other than the employees 8 are visitors 9. Also visitors 9 can be called any other name.

First Embodiment

<System Configuration>

Figure 2:
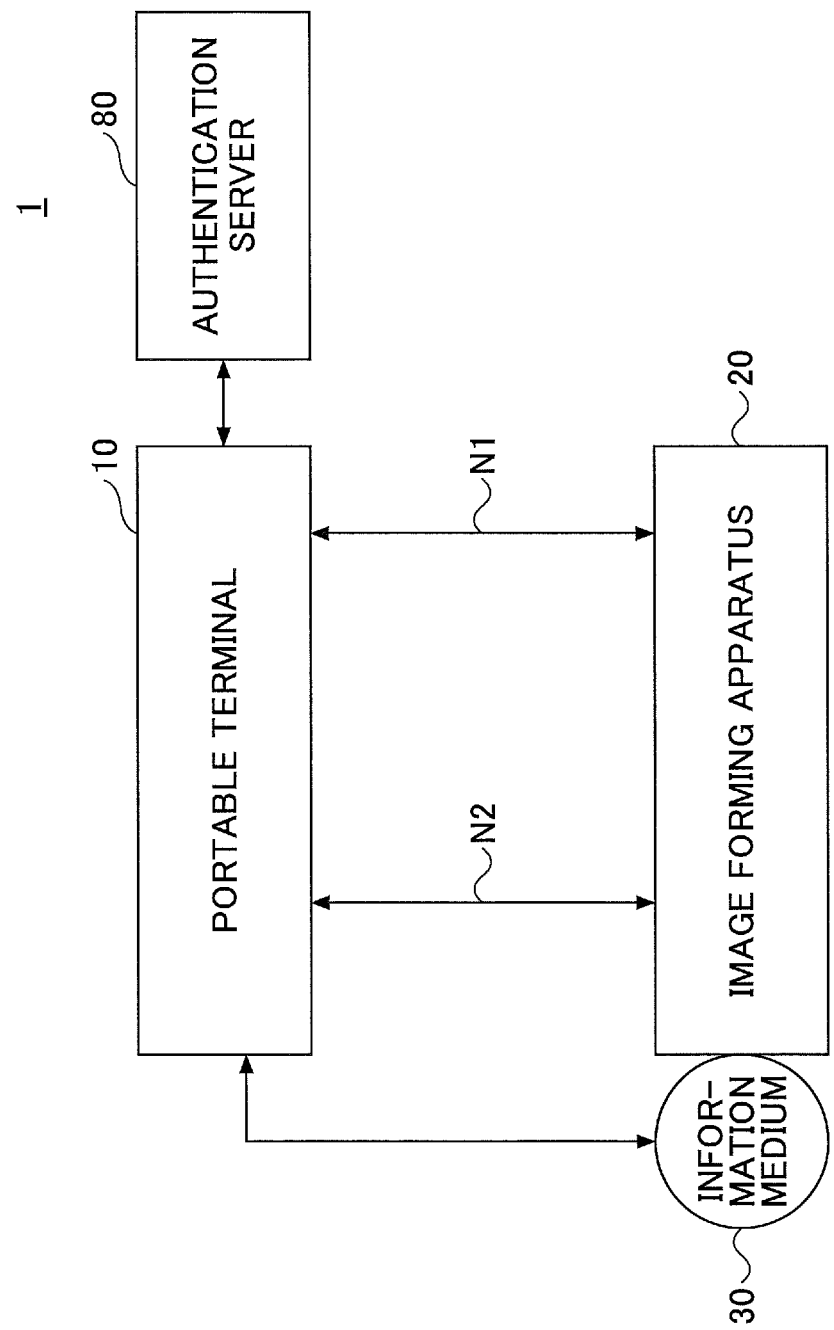
FIG. 2 is a configuration diagram of one example of a printing system.

With reference to FIG. 2, a system configuration of the printing system 1 according to the first embodiment will be described. The printing system 1 is one example of a communications system. FIG. 2 is a configuration diagram of one example of the printing system according to the first embodiment. The printing system 1 of FIG. 2 includes the portable terminal 10, the at least one image forming apparatus 20, and the authentication server 80. The portable terminal 10 and the image forming apparatus 20 are connectable by wire or wirelessly via the network N1 and the network N2. The portable terminal 10 and the authentication server 80 are connectable by wire or wirelessly via the network N3.

The portable terminal 10 is, as will be described later, an information processing apparatus that can be carried by the user. Therefore, the portable terminal 10 and the image forming apparatus 20 or the authentication server 80 are desirably connectable wirelessly via the networks N1 through N3. "Connectable" means that a function for a connection is provided. Whether it is actually connectable depends on a determination result, which will be described later with reference to FIGS. 9 and 10, and so forth.

The network N1 and the network N2 are different networks each of which uses a wireless LAN. According to the first embodiment, "networks are different" means that different wireless communications parameters are needed for corresponding connections. For example, "networks are different" means that different SSIDs (Service Set Identifiers) are needed.

If the portable terminal 10 is carried by a visitor 9, the portable terminal 10 is not connected to the networks N1 and N3, and is connected to the network N2 on demand. An employee 8 previously has an authority to connect to the networks N1 and N3. Therefore, if the portable terminal 10 is carried by the employee 8, a SSID and a password of the access point 6, and a SSID and a password of the access point 7 are perversely set to the portable terminal 10. Therefore, the portable terminal 10 carried by the employee 8 can carry out communications with the image forming apparatus 20 if it holds an IP address of the image forming apparatus 20. The portable terminal 10 can carry out communications with the authentication server 80 if it holds an IP address of the authentication server 80.

Below, as one example, it is assumed that the networks N1 and N3 are networks such as the intracompany LANs for the portable terminal 10 to connect to the image forming apparatus 20 via the wireless LAN (Local Area Network). It is also assumed that the network N2 is a network for directly connecting to the image forming apparatus 20 through P2P using Wi-Fi Direct. However, the networks N1 through N3 are not limited thereto. Specific examples of the networks N1 and N3 include, not only networks such as intracompany LAN, but also WANs and/or the Internet. The specific examples of the networks N1 and N3 include also a cell phone network at a part thereof. Also, the network N2 can be a network for connecting to the image forming apparatus 20 via, for example, an ad-hoc mode of a wireless LAN, a cell phone network, an infrared communications, Bluetooth (registered trademark), and/or the like. In other words, the network N2 is a network not included in the company such as the intracompany LAN. As long as such an appropriate setting is made as to separate the network N2 from the networks N1 and N3, the network N2 can be, for example, an intracompany LAN for connecting to the image forming apparatus 20 via a wireless LAN (for example, a network having a network address different from those of the networks N1 and N3).

In FIGS. 1A and 1B, the network N1 is connected to the access point 7, and the network N3 is connected to the access point 6. However, the network N1 and the network N3 can be connected to the same access point. In this case, for example, if they have different SSIDs, at least logical access points for when connecting to the networks N1 and N3 are different. Also, even if the networks N1 and N3 have the same access point and the same SSID, it is possible to prevent the portable terminal 10 from simultaneously accessing the networks N1 and N3 if the networks N1 and N3 have different network addresses. Assuming that only the employees can access the network N1, the networks N1 and N3 can have the same network address (i.e., the same LAN).

Also, an information medium 30 is attached to the housing of the image forming apparatus 20, and the portable terminal 10 and the information medium 30 can carry out communications via short-range wireless communications.

The portable terminal 10 is a portable information processing apparatus operated by the user, such as a smart phone. Specific examples of the portable terminal 10 can include a smart phone, a cell phone, a tablet terminal, a game machine, a PDA (Personal Digital Assistant), a digital camera, wearable PC, a notebook PC, and so forth. In the portable terminal 10, an application capable of requesting the image forming apparatus 20 to provide a function (for example, sending a printing command to cause the image forming apparatus 20 to print the print target data, causing the image forming apparatus 20 to scan an original copy, causing the image forming apparatus 20 to transmit image data via facsimile, causing the image forming apparatus 20 to copy an image, and/or the like) is installed. The portable terminal 10 generates a print job including print target data concerning a printing command, a scanning job, a facsimile transmission job, a copying job, and so forth, and transmits them to the image forming apparatus 20.

The portable terminal 10 includes, as will be described later, a short-range wireless communications unit such as a NFC chip. By putting the portable terminal 10 over the information medium 30 attached at a predetermined position of the hosing of the image forming apparatus 20, the user acquires a plurality of sets of the communications information including the IP address, and so forth, for carrying out communications with the image forming apparatus 20. Then, by transmitting a print job generated based on the thus acquired communications information to the image forming apparatus 20, the portable terminal 10 can print the print target data by causing the image forming apparatus 20 to execute the print job.

The application can be software such as a browser, document creation software, a viewer, or the like, for carrying out communications with the image forming apparatus 20 and requesting the image forming apparatus 20 to execute a job.

The image forming apparatus 20 is a printer, or the like, that receives a print job or the like from the portable terminal 10, and prints print target data. The image forming apparatus 20 can be a multifunction peripheral (MFP) having a plurality of functions such as, in addition to a printing function, a copying function, a scanner function, a facsimile transmission and reception function, and so forth.

Also, the image forming apparatus 20 can be, for example, an outputting apparatus such as a scanner apparatus, a facsimile apparatus, an image projection apparatus (projector), a rear projection apparatus, a Head Up Display (HUD) apparatus, an electronic blackboard, a digital signage, or the like, or a sound outputting apparatus such as a speaker apparatus. According to the first embodiment, as a specific example of a communications system, the printing system is described. However, it is not necessary to limit thereto. For example, the communications system can be an image outputting system using an image outputting apparatus instead of the image forming apparatus 20, a sound outputting system using a speaker apparatus instead of the image forming apparatus 20, or the like. That is, the first embodiment can be applied to various systems using the portable terminal 10 that generates various jobs and images or data convertible to images; and an apparatus (the image forming apparatus 20, in the first embodiment) that executes the various jobs and outputs the images or the data convertible to images received from the portable terminal 10. The first embodiment can also be applied to a system where the portable terminal 10 and the apparatus carry out wireless communications only, and the apparatus does not output data.

The information medium 30 is a short-range wireless communications unit such as a NFC chip attached at a predetermined position of the housing of the image forming apparatus 20. That is, the information medium 30 is a NFC tag or the like. The information medium 30 stores communications information including an IP address of the image forming apparatus 20, to which the information medium 30 is attached. In more detail, the information medium 30 stores communications information for the portable terminal 10 to carry out communications with the image forming apparatus 20 via the network N1, communications information for the portable terminal 10 to carry out communications with the image forming apparatus 20 via the network N2, and authentication connection information for the portable terminal 10 to carry out communications with the authentication server 80 via the network N3. That is, the information medium 30 stores the communications information corresponding to the number of networks, to which the portable terminal 10 and the image forming apparatus 20 are connectable.

The portable terminal 10 can acquire the communications information stored in the information medium 30 via the short-range wireless communications. Then, as described above, the portable terminal 10 can execute a print job through the image forming apparatus 20 by transmitting the print job to the image forming apparatus 20 based on the communications information thus acquired from the information medium 30. A device that stores the communications information 1000 and transmits it to the portable terminal 10 is not limited to the information medium 30 such as an NFC tag. Assuming that the image forming apparatus 20 stores the communications information, the image forming apparatus 20 can directly transmit the communications information 1000 to the portable terminal 10 using another communications way capable of directly carrying out communications with the portable terminal 10 without previously needing an address or the like, such as, for example, Bluetooth (registered trademark), infrared rays, or the like. In this case, also the portable terminal 10 needs to have a communications function such as Bluetooth or infrared rays.

The authentication server 80 is an information processing apparatus that is used to authenticate the portable terminal 10. The authentication server 80 receives, from the portable terminal 10, authentication information (an employee ID and a password), and determines, based on the employee ID and the password, whether the employee authentication succeeds. If the authentication succeeds, "authentication success" information is returned to the portable terminal 10. If the authentication is failed, "authentication failure" information is returned to the portable terminal 10.

In the above-described printing system 1, the portable terminal 10 and the image forming apparatus 20 are connectable via the two networks, i.e., the network N1 and the network N2. However, the number of networks, via which they are connectable, can be any number greater than or equal to 1 (it can be 3 or more).

Also, the above-described printing system 1 can include, for example, a printing server or the like that stores print jobs transmitted by the portable terminal 10. Also, the printing system 1 can include any number of the portable terminals 10, which is greater than or equal to 1.

<Hardware Configuration>
<<Portable Terminal>>

Figure 3:
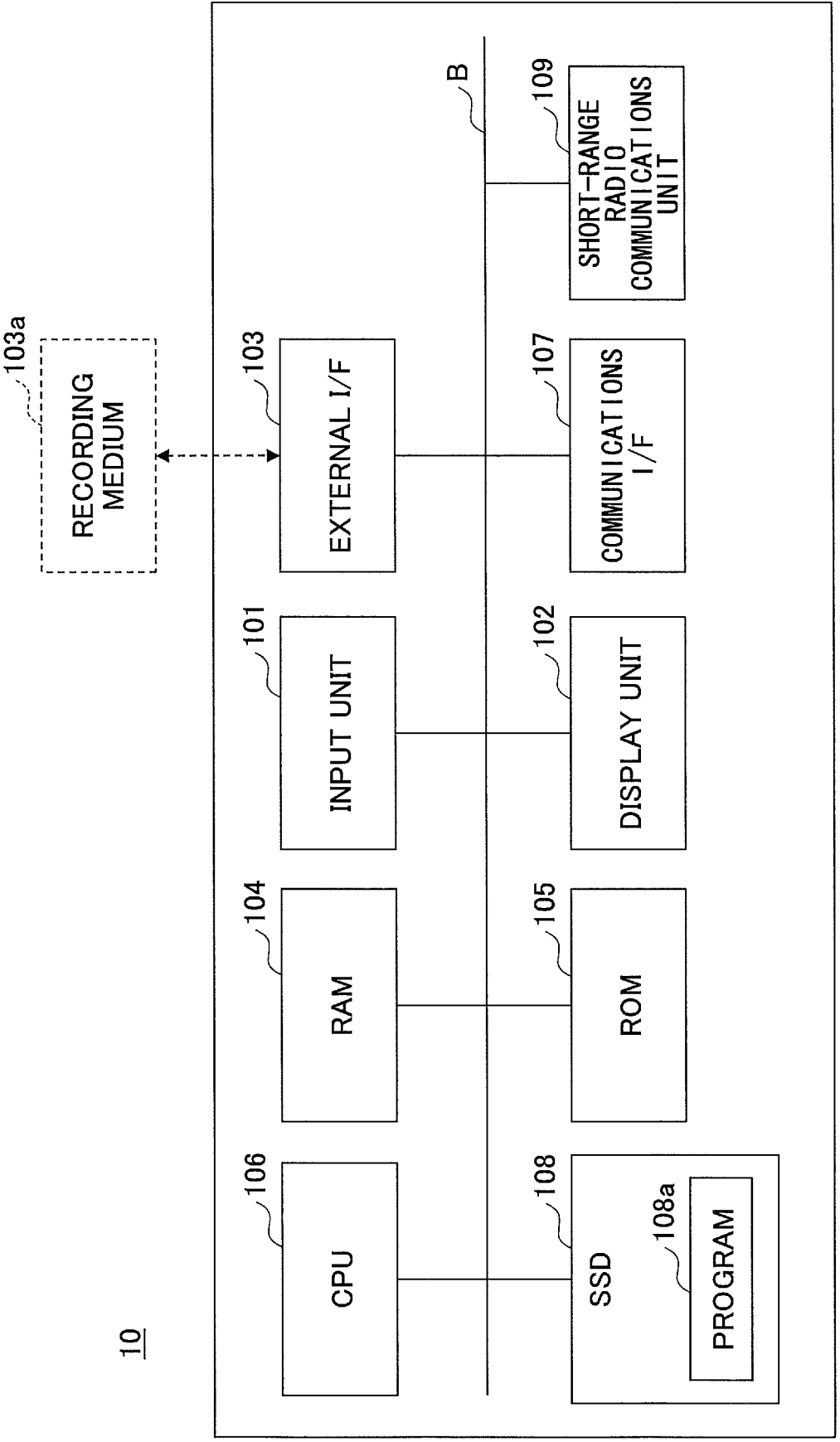
FIG. 3 is a hardware configuration diagram of one example of a portable terminal.

The portable terminal 10 according to the first embodiment is, for example, implemented by a hardware configuration shown in FIG. 3. FIG. 3 is a hardware configuration diagram of one example of the portable terminal according to the first embodiment. The portable terminal 10 shown in FIG. 3 includes an input unit 101, a display unit 102, an external I/F 103, a Random Access Memory (RAM) 104, a Read-Only Memory (ROM) 105, a Central Processing Unit (CPU) 106, a communications I/F 107, a Solid State Drive (SSD) 108, and a short-range wireless communications unit 109. They are mutually connected by a bus B.

The input unit 101 is, for example, a touch panel, and is used to input various operation signals to the portable terminal 10. Note that, the input unit 101 can be a keyboard, a mouse or the like. The display unit 102 is, for example, a Liquid Crystal Display (LCD), and displays processing results of the portable terminal 10.

The external I/F 103 is an interface for an external device. The external device can be a recording medium 103a, or the like. The recording medium 103a can store a program(s) that implements functions of the first embodiment. The portable terminal 10 can read and write information via the external I/F 103 from/to the recording medium 103a.

The recording medium 103a is, for example, a recording medium such as a SD memory card. The recording medium 103a can also be a recording medium such as a USB (Universal Serial Bus) memory, a DVD (Digital Versatile Disk), a CD (Compact Disk), or a flexible disk.

The RAM 104 is a volatile semiconductor memory (a storage unit) that temporarily stores programs, data, and so forth. The ROM 105 is a nonvolatile semiconductor memory (a storage unit) that can hold programs and data even after the power supply thereto is turned off. The ROM 105 stores programs and data such as a BIOS (Basic Input/Output System) executed when the portable terminal 10 is started, OS settings, network settings, and so forth.

The CPU 106 is a processing unit that reads programs and data from the storage unit such as the ROM 105 or the SSD 108 to the RAM 104, and carries out processes to control the entire portable terminal 10 and implements the functions of the portable terminal 10.

The communications I/F 107 is an interface for carrying out communications via the network N1 and the network N2. For example, the communications I/F 107 is an interface for connecting the portable terminal 10 to an intracompany LAN or the like via a wireless LAN. Also, the communications I/F 107 is an interface for connecting to the image forming apparatus 20 through Wi-Fi Direct. Thus, the portable terminal 10 can carry out data communications via the communications I/F 107. Note that the communications I/F 107 can also be an interface for connecting to a cell phone network, the Internet, or the like.

The SSD 108 is a nonvolatile storage unit that stores a program 108a and data. The stored program 108a and data include, for example, an OS (Operating System) that is basic software and controls the entire portable terminal 10, application software (hereinafter, simply referred to as "applications") that provides various functions under the control of the OS, and so forth. The SSD 108 manages the stored programs and data with a predetermined file system and/or a DB (database). Note that, the portable terminal 10 can have, instead of or in addition to the SSD 108, a HDD (Hard Disk Drive), or the like.

The short-range wireless communications unit 109 is, for example, a communications unit for carrying out communications through a NFC chip or Bluetooth (registered trademark) Low Energy. Thus, the portable terminal 10 can carry out data communications via the short-range wireless communications unit 109.

The portable terminal 10 according to the first embodiment can implement various processes that will be described later using the above-mentioned hardware configuration.

<<Image Forming Apparatus and Information Medium>>

Figure 4:
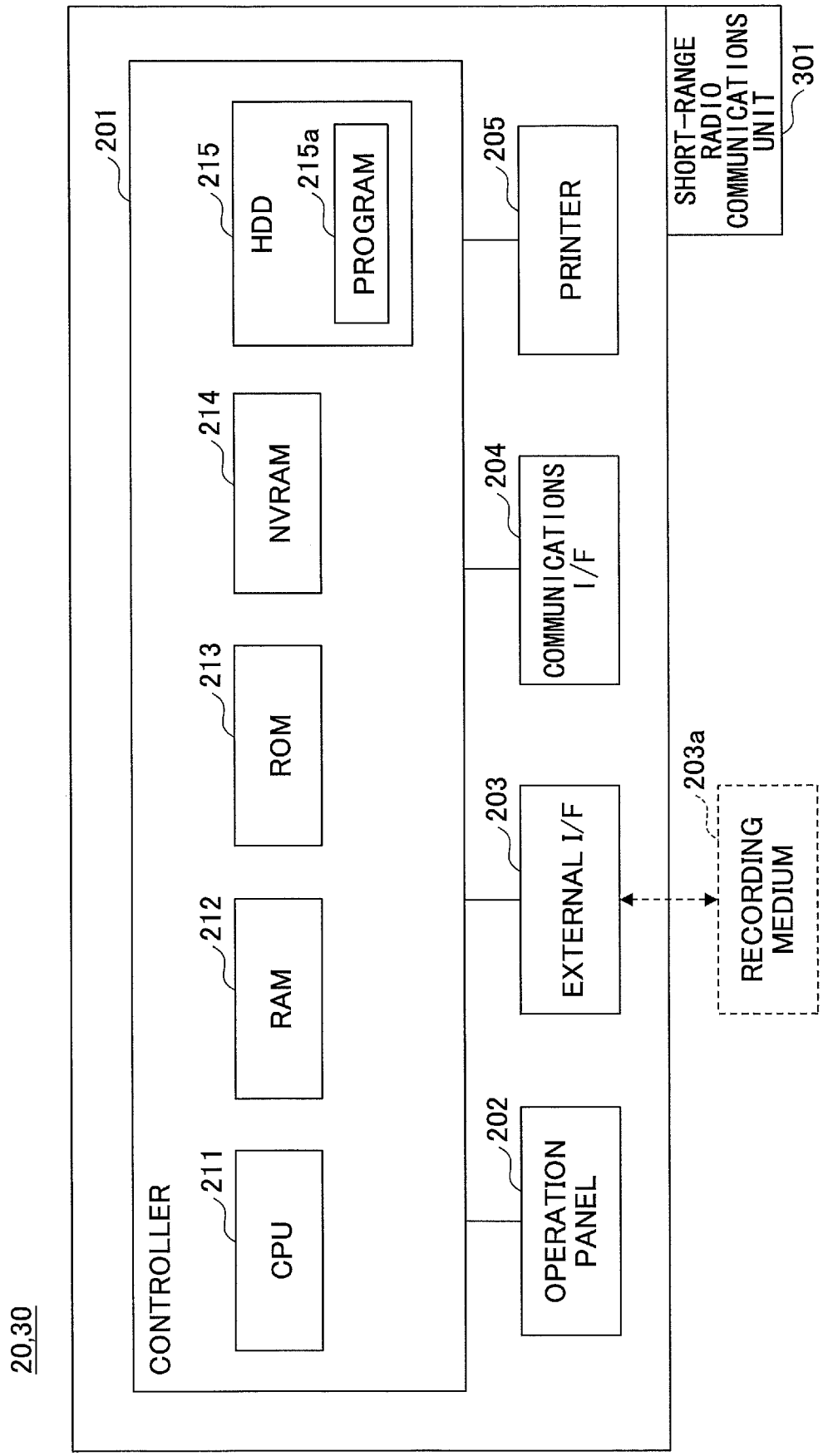
FIG. 4 is a hardware configuration diagram of one example of an image forming apparatus and an information medium.

The image forming apparatus 20 and the information medium 30 according to the first embodiment are implemented by hardware configurations, for example, as shown in FIG. 4. FIG. 4 is a hardware configuration diagram of one example for the image forming apparatus and the information medium according to the first embodiment. The image forming apparatus 20 shown in FIG. 4 includes a controller 201, an operation panel 202, an external I/F 203, a communications I/F 204, and a printer 205. On the outside (housing) of the image forming apparatus 20, a short-range wireless communications unit 301 that implements the information medium 30 is attached.

The controller 201 includes a CPU 211, a RAM 212, a ROM 213, a NVRAM 214, and a HDD 215. The ROM 213 stores various programs and data. The RAM 212 temporarily stores programs and data. The NVRAM 214 stores, for example, setting information, and so forth. The HDD 215 stores various programs 215a and data.

The CPU 211 reads the programs 215a and data, setting information, and so forth, from the ROM 213, the NVRAM 214, the HDD 215, or the like to the RAM 212, and carries out processes to control the entire image forming apparatus 20 and implement functions of the image forming apparatus 20.

The operation panel 202 has an input part that is used to input operations of the user, and a display part that displays, for example, processing results or the like. The external I/F 203 is an interface for an external device. The external device can be a recording medium 203a or the like. Thus, the image forming apparatus 20 can read and write information via the external I/F 203 from/to the recording medium 203a. The recording medium 203a can be a flexible disk, a CD, a DVD, a SD memory card, a USB memory card, or the like.

The communications I/F 204 is an interface for carrying out communications via the network N1 and the network N2. Thus, the image forming apparatus 20 can carry out data communications via the communications I/F 204. The printer 205 is a printing unit that outputs print target data by printing it.

The short-range wireless communications unit 301 is, for example, a communications unit that carries out communications via an NFC chip or Bluetooth (registered trademark) Low Energy. The information medium 30 is implemented in a nonvolatile memory in the short-range wireless communications unit 301. The short-range wireless communications unit 301 can carry out communications with the short-range wireless communications unit 109 of the portable terminal 10 to read information from the information medium 30 and transmit information of the information medium 30 to the portable terminal 10, after detecting that the portable terminal 10 approaches the short-range wireless communications unit 109. The short-range wireless communications unit 301 is configured on the outside of the image forming apparatus 20 as a result of, for example, a NFC chip being attached at a predetermined position on the housing of the image forming apparatus 20. In this case, it is desirable that the NFC chip is attached to such a position that it can easily carry out short-range wireless communications with the portable terminal 10. The information in the information medium 30 can be rewritten by the user of the image forming apparatus 20 using a NFC reader/writer, or the like.

Note that, instead of being configured outside the image forming apparatus 20, the short-range wireless communications unit 301 can also be configured inside the image forming apparatus 20 within such an area that it can carry out short-range wireless communications with the portable terminal 10. Also, it is not necessary that the short-range wireless communications unit 301 is integral with the image forming apparatus 20. That is, the short-range wireless communications unit 301 can be placed near the image forming apparatus 20, or can be placed on a guide plate installed on a path toward the image forming apparatus 20, for example.

The image forming apparatus 20 and the information medium 30 according to the first embodiment can implement various processes that will be described later using the above-mentioned hardware configurations.

Figure 5:
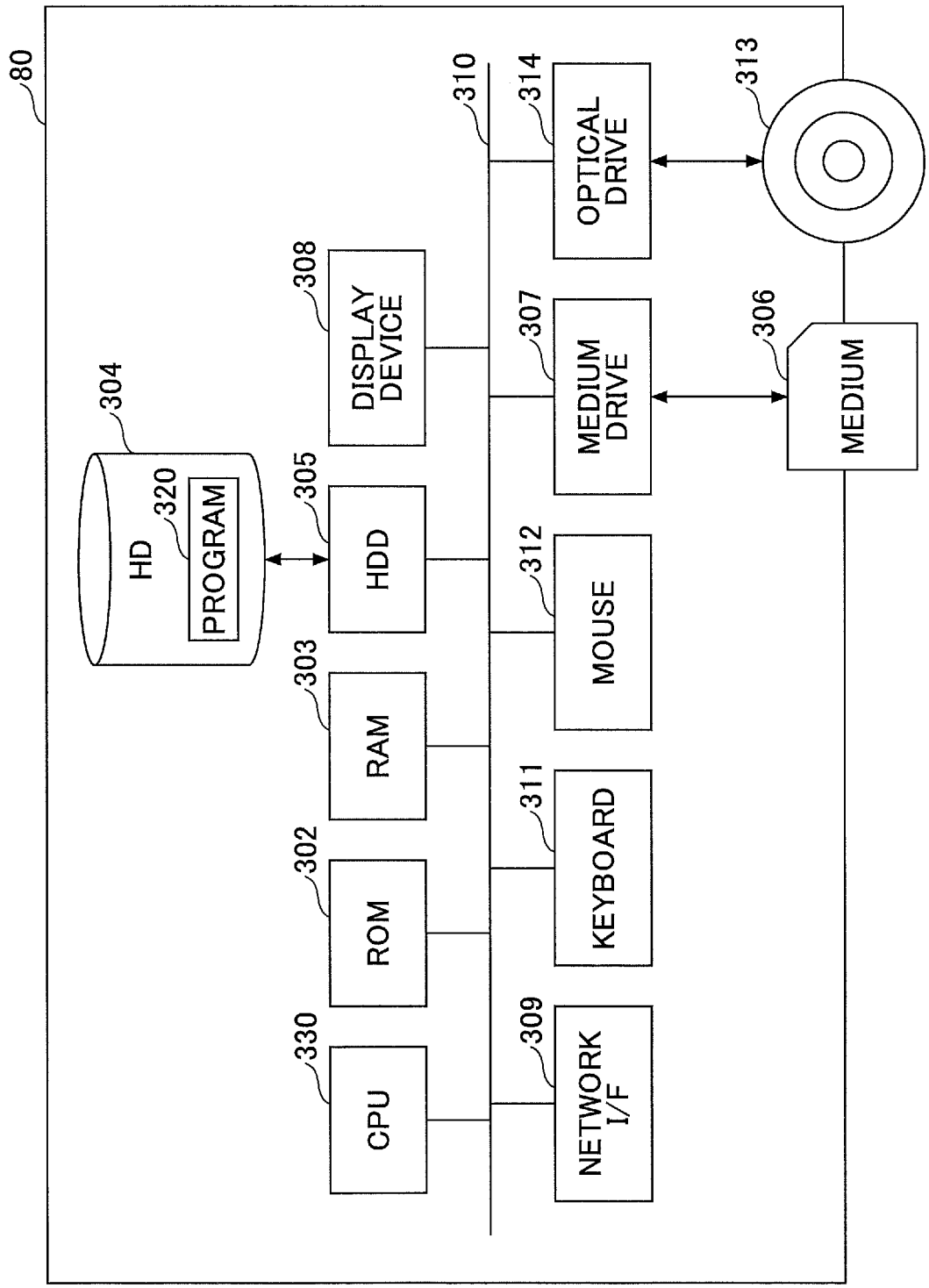
FIG. 5 is a hardware configuration diagram of one example of an authentication server.

FIG. 5 is a hardware configuration diagram of one example of the authentication server 80. The authentication server 80 includes a CPU 330, a ROM 302, a RAM, 303, a HDD 305, a display device 308, a network I/F 309, a keyboard 311, a mouse 312, a medium drive 307, and an optical drive 314, which are connected via a bus 310. The CPU 330 executes a program 320 stored in the HD 304, and controls the entirety of operations of the authentication server 80. The ROM 302 stores a program to be used to drive the CPU 330, such as an IPL. The RAM 303 is used by the CPU 330 as a work area. The HD 304 is a storage unit having a nonvolatile memory, and stores the program 320 for carrying out authentication, OS, and so forth.

The HDD (Hard Disk Drive) 305 controls reading and writing various data from/to the HD 304 under the control of the CPU 330. The display device 308 displays various information such as a cursor, menus, windows, characters/letters, and images. The network I/F 309 is an interface for the network N3. The keyboard 311 and the mouse 312 are input units. The keyboard 311 has a plurality of keys for inputting characters/letters, numeral values, various instructions, and so forth, and receives inputs from the keys. The mouse 312 receives an instruction to move a mouse pointer, select or execute various commands, select processing targets, and so forth.

The medium drive 307 controls data reading and/or writing (storing) from/to a medium 306 such as a flash memory. The optical drive 314 controls various data reading and/or writing from/to a detachable recording medium such as a Compact Disc Read-Only Memory (CD-ROM) 313.

Note that, the program 320 can have a form of a file having an installable or executable format, and can be circulated after being stored in a computer-readable recording medium such as the medium 306, the CD-ROM 313, or the like. Alternatively, the program 320 can be distributed as a result of being downloaded from a certain server-type information processing apparatus.

Note that, the authentication server 80 can be implemented through cloud computing. That is, the hardware configuration of the authentication server 80 shown in FIG. 5 is not necessarily included in a single housing as an integral unit. That is, FIG. 5 shows hardware elements/components that the authentication server 80 desirably includes.

<Software Configuration>

The printing system 1 according to the first embodiment can be expressed by, for example, function blocks shown in FIG. 6. FIG. 6 is a functional block diagram of one example of the printing system according to the first embodiment.

<<Functions of Portable Terminal>>

The portable terminal 10 of the printing system 1 includes an authentication request part 11, an information acquisition part 12, a connection possibility determination part 13, a UI display part 14, a communications part 15, an information storage part 16, an operation reception part 17, and a communications switching control part 18. The communications part 15 includes a first communications part 151, a second communications part 152, and a server communications part 159.

The information acquisition part 12 is implemented by the CPU 106, the short-range wireless communications unit 109, and so forth, and acquires a plurality of sets of communications information for carrying out communications with the image forming apparatus 20, and authentication connection information 900 for carrying out communications with the authentication server 80, from the information medium 30 via the short-range wireless communications.

The connection possibility determination part 13 is implemented by the CPU 106 and so forth, and selects, based on the plurality of sets of the communications information acquired from the information medium 30, one of plurality of networks that are connectable to the image forming apparatus 20 to be used to carry out communications. According to the first embodiment, actually, based on the plurality of sets of the communications information acquired from the information medium 30, either the network N1 or the network N2 is selected to be used to carry out communications with the image forming apparatus 20.

The UI display part 14 is implemented by the CPU 106, the display unit 102, and so forth, and generates and displays UI (user interface) screen pages.

The communications part 15 is implemented by the communications I/F 107 and so forth, and carries out communications with the image forming apparatus 20 and communications with the authentication server 80. In more detail, according to the selection result of the connection possibility determination part 13, the first communications part 151 carries out communications with the image forming apparatus 20 via the network N1, and the second communications part 152 carries out communications with the image forming apparatus 20 via the network N2. Also, the server communications part 159 carries out communications with the authentication server 80 via the network N3.

The operation reception part 17 is implemented as a result of the CPU 106 executing the application and cooperating with the input unit 101, and receives the user's operations.

The information storage part 16 is implemented by the CPU 106, the ROM 105, the SSD 108, and so forth, stores the communications information 1000 acquired from the information acquisition part 12, and reads the stored information. In the information storage part 16, the authentication information (the employee ID and the password) of the user of the portable terminal 10 that are input to and received by the operation reception part 17 is stored.

The authentication request part 11 is implemented by the CPU 106 and so forth, and, based on the authentication connection information 900 acquired from the information medium 30, carries out communications with the authentication server 80 to transmit the authentication information (the employee ID and the password) and receive the authentication result (authentication success or authentication failure).

The communications switching control part 18 is implemented by the CPU 106 and so forth. If it is determined to send a request to carry out a job to the image forming apparatus 20 via the network N1, and the portable terminal 10 is currently connected to another network than the network N1, the communications switching control part 18 switches the other network to the first network N1 to be used to carry out communications.

<<Functions of Image Forming Apparatus>>

The image forming apparatus 20 of the printing system 1 includes a print function part 21. The print function part 21 is implemented by the printer 205 and so forth, and prints print target data included in a print job that the portable terminal 10 requests to execute. Note that, the image forming apparatus 20 can have, in addition to the print function part 21, a scanner function part that generates image data (electronic data) from an original copy that is read, a copying function part that copies an original copy that is read, a facsimile function part that transmits an original copy that is read or electronic data through facsimile via a telephone network or the like, and so forth.

The information medium 30 is implemented by the short-range wireless communications unit 301, and stores the communications information 1000 to be used to carry out communications with the image forming apparatus 20 to which the information medium 30 is attached. Also, the information medium 30 transmits the communications information 1000 stored in the information medium 30 to the portable terminal 10 via the short-range wireless communications according to a request from the information acquisition part 12 of the portable terminal 10.

<<Functions of Authentication Server>>

The authentication server 80 has a transmission/reception part 81 and an authentication part 82. Also, the authentication server 80 has an authentication DB 83 created in the HD 304, the ROM 302, or the like.

TABLE 1

| EMPLOYEE ID | PASSWORD |
|---|---|
| 001 | AAA |
| 002 | BBB |
| 003 | CCC |
| ... | ... |

Table 1 is one example of an authentication information table. The authentication information table such as that shown in Table 1 is stored in the authentication DB 83. In the authentication information table, the employee IDs and the passwords of all the employees who are allowed to use the image forming apparatus 20 are registered in such a manner that the employee IDs and the passwords are regarded as sets, respectively. The employee IDs are identification information such as characters/letters, signs, symbols, various marks, or the like, to be used to uniquely identify the respective employees of the company where the image forming apparatus 20 is installed.

The transmission/reception part 81 is implemented as a result of the CPU 330 executing the program 320 and cooperating with the network I/F 309, and receives the authentication information (the employee ID and the password) from the portable terminal 10, and returns thereto the authentication result, via the network N3.

The authentication part 82 searches for the same set of the employee ID and the password as those received by the transmission/reception part 81. If the same set of the employee ID and the password as those received is present in the authentication information table, it returns authentication success information to the portable terminal 10. If the same set of the employee ID and the password as those received is not present in the authentication information table, it returns authentication failure information to the portable terminal 10.

<Communications Information Stored in Information Medium>

Figure 7B:
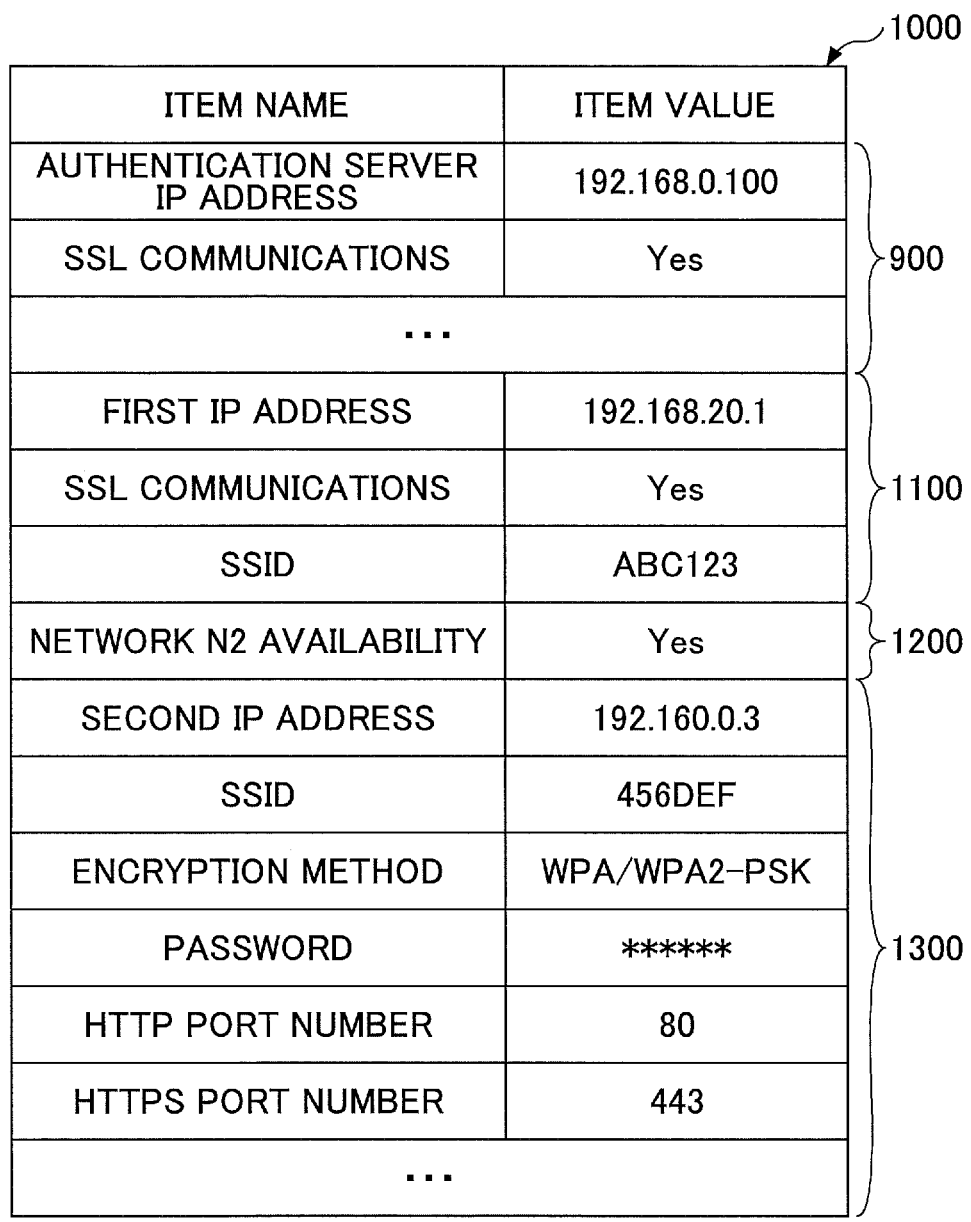

With reference to FIGS. 7A and 7B, the communications information 1000 stored in the information medium 30 will now be descried. Note that, the communications information 1000 stored in the information storage part 16 of the portable terminal 10 has the same configuration. FIGS. 7A and 7B illustrates one example of the communications information.

The communications information 1000 shown in FIG. 7A includes the authentication connection information 900 for carrying out communications with the authentication server 80 via the network N3, the first communications information 1100 for carrying out communications with the image forming apparatus 20 via the network N1, availability information 1200 that indicates whether communications via the network N2 is available, and the second communications information 1300 for carrying out communications with the image forming apparatus 20 via the network N2. Thus, the communications information 1000 includes a plurality of sets of the communications information, i.e., the authentication connection information 900, the first communications information 1100, and the second communications information 1300.

The authentication connection information 900 is information necessary for the portable terminal 10 to carry out communications with the authentication server 80 via the network N3 (for example, an intracompany LAN connected via a wireless LAN). The authentication connection information 900 includes the IP address of the authentication server 80 in the network N3, information that indicates whether SSL (Secure Sockets Layer) communications is available in the network N3, and so forth. Through authentication, a visitor 9 can be prevented from connecting to the intracompany LAN or the like, and only an employee 8 can be connected to the intracompany LAN.

The authentication connection information 900 does not include the SSID and the password to be used to connect to the intracompany LAN or the like via the access point 6. This is because, as mentioned above, the network N3 is expected to be used by the employee 8, and the SSID and the password are previously set to the portable terminal 10 of the employee 8. However, even if the SSID and the password of the intracompany LAN or the like are set in the authentication connection information 900, the security is not so much reduced because the authentication server 80 carries out authentication as to whether the user is an employee.

The authentication connection information 900 is not necessarily acquired from the image forming apparatus 20, and can be previously stored in the portable terminal 120.

The first communications information 1100 is information necessary for the portable terminal 10 to carry out communications with the image forming apparatus 20 via the network N1 (for example, an intracompany LAN connected via a wireless LAN). The first communications information 1100 includes a first IP address that is an IP address of the image forming apparatus 20 in the network N1, information that indicates whether SSL (Secure Sockets Layer) communications is available in the network N1, and so forth. Also, the first communications information 1100 includes information to be used to identify the network such as the SSID of the intracompany LAN or the like. According to the first embodiment, employee authentication is carried out before carrying out communications with the image forming apparatus 20. Therefore, even if the password is set in the first communications information 1100 in addition to the SSID, the security is not so much reduced.

However, it is possible to improve the security by not including the password and so forth in the first communications information 1100. For example, as shown in FIG. 7B, the first communications information 1100 that does not includes the encryption method, the password, the HTTP port number, and HTTPS port numbers can be stored in the information medium 30. The portable terminal 10 that can connect to the image forming apparatus 20 via the network N1 should have already held the password and so forth, for connecting to the network N1. In contrast thereto, it is not desirable from a security viewpoint that the password and so forth are provided to the portable terminal 10 for which a connection to the network N1 is not permitted. Therefore, the first communications information 1100 as shown in FIG. 7B is desirable.

The SSID and the password of the first communications information 1100 can be encrypted for improving the security. The decryption key for decrypting the thus encrypted data is previously stored in the portable terminal 10, or is transmitted from the authentication server 80 when the authentication succeeds.

The communications information that includes only the information to be used to identify the network or the communications information where the SSID and the password are encrypted may be referred to as "communications information for the employees" (one example of a "first set of communications information").

The availability information 1200 indicates, if employee authentication does not succeed, or the connection possibility determination part 13 determines that communications with the image forming apparatus 20 via the network N1 cannot be carried out, whether communications via the network N2 is to be carried out. For example, in the communications information 1000 of FIGS. 7A and 7B, the availability information 1200 is set to be "Yes". Therefore, in this case, as will be described later in detail, if employee authentication does not succeed or the connection possibility determination part 13 determines that communications with the image forming apparatus 20 via the network N1 cannot be carried out, the portable terminal 10 tries communications with the image forming apparatus 20 via the network N2. In contrast thereto, if the availability information 1200 is set to be "No", the portable terminal 10 cannot carry out communications with the image forming apparatus 20 via the network N2.

The availability information 1200 is used for, for example, controlling charging the user. Usage fee for the image forming apparatus 20 may be charged at mater rate for the number of printing sheets. For example, when the image forming apparatus 20 is installed in a company A, the company A is charged for usage fee without regard to whether an employee 8 of the company A carries out printing or a visitor 9 for the company A carries out printing. Therefore, the company A may completely deny printing by visitors 9 for the image forming apparatus 20 installed at a place where there are many visitors 9.

In contrast thereto, for example, a city hall, a library, or the like, needs to fulfill requests of visitors 9 to carry out printing. Therefore, in such a highly public place, the image forming apparatus 20 is installed together with a coin mechanism, and printing by a visitor 9 is permitted to the extent of the amount already paid by the user.

Thus, for the image forming apparatus 20 installed at a place where a visitor can be charged or a place where the number of printing sheets is sufficiently small can permit a visitor 9 to carry out printing. Therefore, the availability information 1200 can control whether to permit a visitor 9 to use the image forming apparatus 20.

Note that, also in the first communications information 1100, such availability information can be set. Thereby, for example, it is possible to prevent the employee 8 from carrying out communications with the image forming apparatus 20 via the network N1 if the network N1 has a problem concerning the security or the like.

The second communications information 1300 is information necessary for the portable terminal 10 to carry out communications with the image forming apparatus 20 via the network N2 (for example, P2P using Wi-Fi Direct). The second communications information 1300 includes a second IP address that is an IP address of the image forming apparatus 20 in the network N2, a SSID (Service Set Identifier) to be used to identify the network N2, an encryption method and a password in the network N2, the HTTP (HyperText Transfer Protocol) port number or the HTTPS (HTTP over SSL/TLS) port number in the image forming apparatus 20 to be used for carrying out communications via the network N2, and so forth. If the image forming apparatus 20 does not encrypt information when carrying out communications, communications itself can be carried out without passwords. Such communications information that stores the SSID and the password may be referred to as "communications information that can be used by visitors" (one example of a "second set of communications information").

The above-mentioned information included in the authentication connection information 900, the first communications information 1100 and the second communications information 1300 is one example. The authentication connection information 900, the first communications information 1100 and the second communications information 1300 can include various information to be used to carry out communications via the network N3, the network N1, and the network N2, respectively. In the above-mentioned communications information 1000, the first IP address is different from the second IP address. However, these can be the same IP address.

If the portable terminal 10 and the image forming apparatus 20 can also be connected via, for example, a network N4, the communications information 1000 can include availability information that indicates whether to permit communications via the network N4, and third communications information for carrying out communications with the image forming apparatus 20 via the network N4.

<Employee ID and Password>

Figure 8:
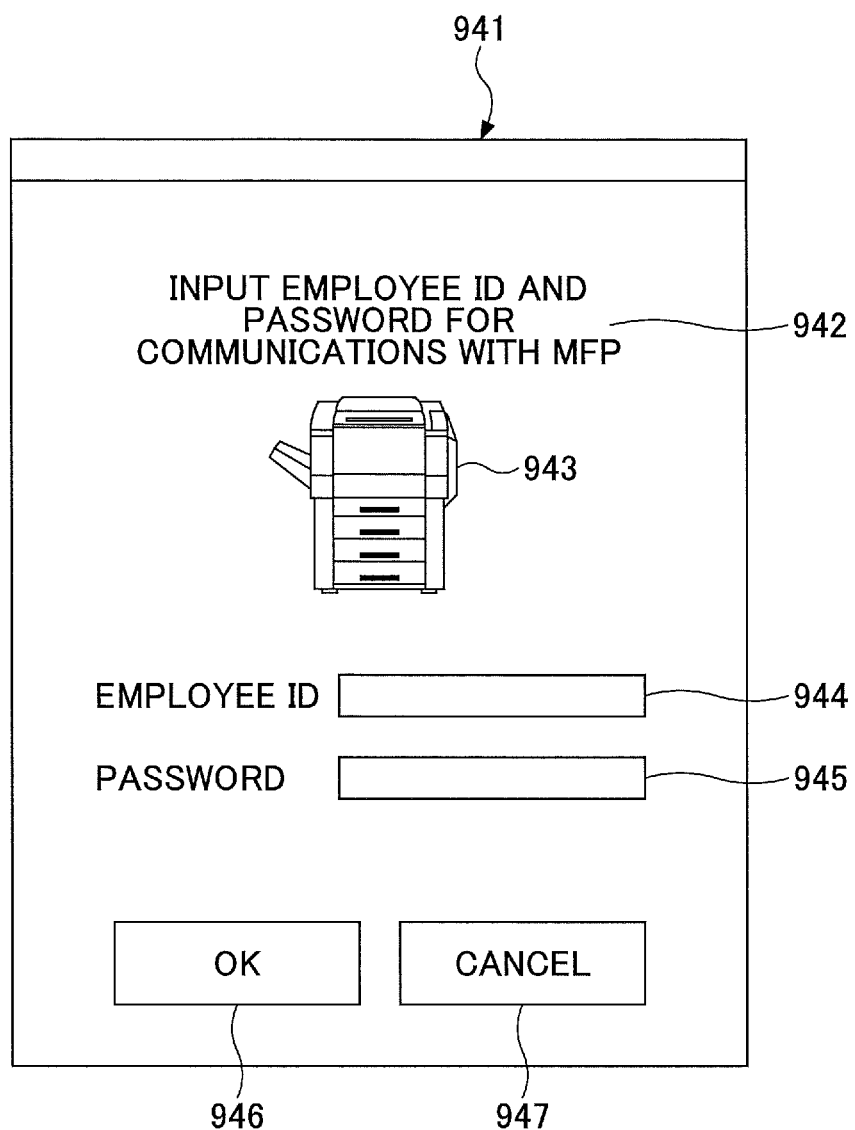
FIG. 8 illustrates one example of an authentication information input screen page.

With reference to FIG. 8, inputting the employee ID and the password will now be descried. FIG. 8 illustrates one example of an authentication information input screen page. The authentication information input screen page 941 includes a message 942 "input employee ID and password for communications with MFP", an icon 943 of an MFP, an employee ID input field 944, a password input field 945, an OK button 946, and a CANCEL button 947. If the user inputs the employee ID in the employee ID input field 944, inputs the password in the password input field 945, and presses the OK button 946, the employee ID and the password that are thus input are stored in the information storage part 16.

The authentication information input screen page 941 can be displayed on the display unit 102 by the user when the user wishes to store the employee ID and the password in the portable terminal 10. Also, if the employee ID and the password have not been stored to the information storage part 16 yet, the authentication information input screen page 941 can be displayed on the display unit 102 immediately before the portable terminal 10 sends an authentication request to the authentication server 80.

The application installed in the portable terminal 10 can be widely distributed to the users of the image forming apparatus 20. Therefore, each user can freely store his or her employee ID and password in the portable terminal 10. However, as will be descried below, whether the employee ID and the password are actually stored in the portable terminal 10 depends on each particular portable terminal 10.

For example, when the employees 8 are authenticated to use the image forming apparatus 20 from the portable terminal 10 in a company A, the employee IDs and the passwords may have been already stored in their portable terminals 10. In a company B that authenticates the employees 8 in the same way, the portable terminals 10 of the employees 8 of the company B may have stored their employee IDs and passwords of the company B. However, if an employee 8 of a company C that has no image forming apparatus 20 to be used from the portable terminal 10 installs the application in the portable terminal 10 outside the company C, neither employee ID nor password may be stored in the portable terminal 10. Also, there may be a case where, neither employee IDs nor passwords are stored even in the portable terminals 10 of the employees 8 of the companies A and B. Thus, there can be the portable terminals 10 that store neither employee IDs nor passwords.

<Process Detail>

Next, the process of the printing system 1 will be described in detail.

<<Printing Process>>

Figure 9:
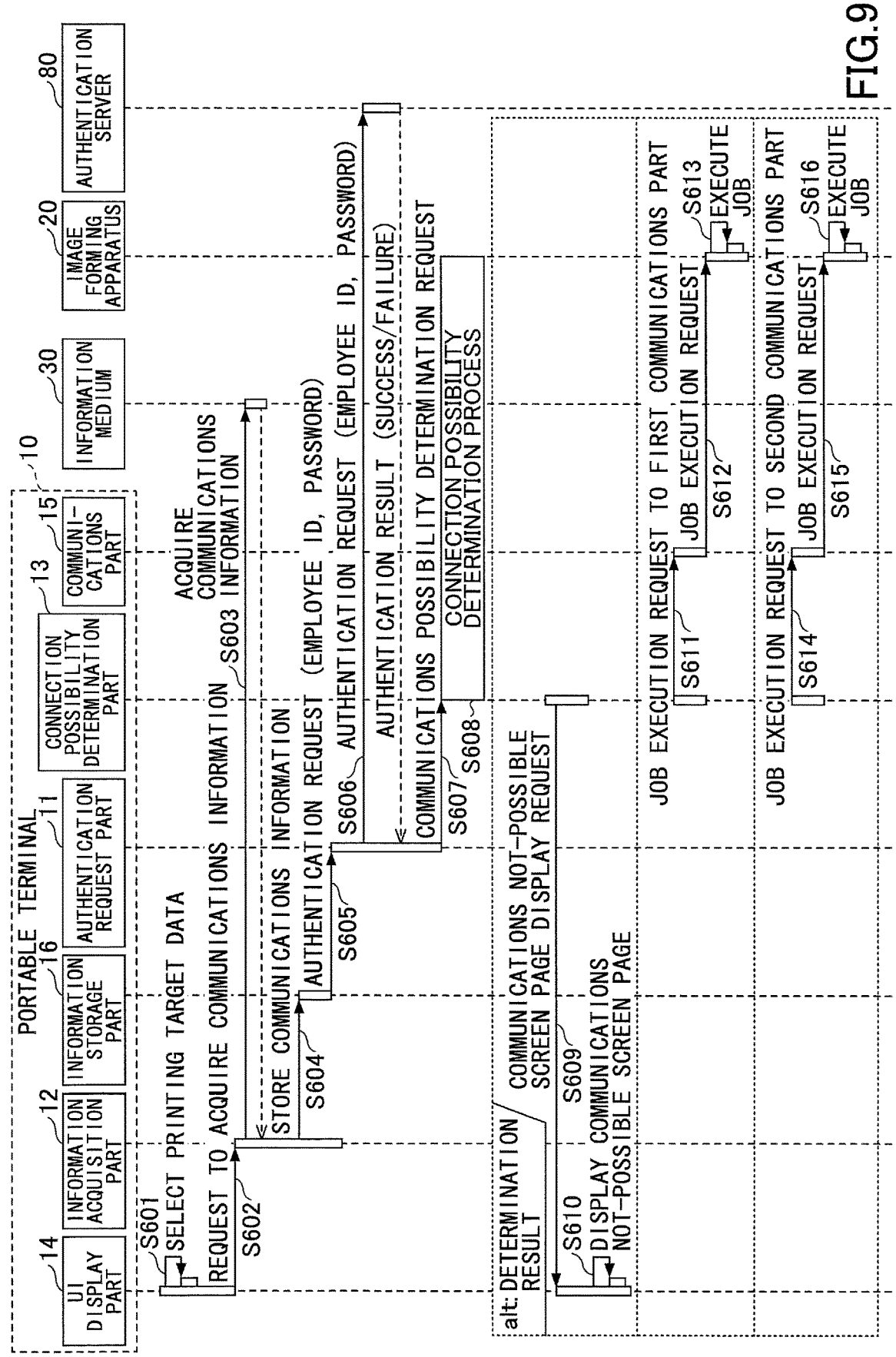
FIG. 9 illustrates a sequence of a printing process.

First, a flow of a printing process of the printing system 1 according to the first embodiment will be described. FIG. 9 illustrates a sequence of a printing process according to the first embodiment.

In step S601, the user uses the UI display part 14, selects desired print target data via the application installed in the portable terminal 10, and inputs a printing instruction. Thereby, a print job including the print target data selected by the user is generated.

In step S602, after the UI display part 14 of the portable terminal 10 receives a print job execution notification, the UI display part 14 transmits a request to acquire the communications information 1000 to the information acquisition part 12. Thereafter, the portable terminal 10 enters a state of waiting for detecting a start of short-range wireless communications by the short-range wireless communications unit 109. During the period of time, a screen page can be displayed on the display unit 102 to urge the user to put the portable terminal 10 over the position of the NFC chip (the information medium 30) of the image forming apparatus 20.

In step S603, when the user puts the portable terminal 10 over the information medium 30, the information acquisition part 12 detects a start of short-range wireless communications with the information medium 30, and acquires the communications information 1000 from the information medium 30.

In step S604, the information acquisition part 12 of the portable terminal 10 stores the communications information 1000 acquired from the information medium 30 in the information storage part 16.

In step S605, the information storage part 16 of the portable terminal 10 reads the employee ID and the password, and requests the authentication request part 11 to carry out authentication using the authentication connection information 900 included in the communications information 1000.

In step S606, the authentication request part 11 of the portable terminal 10 uses the authentication connection information 900 to connect to the authentication server 80, and transmits an authentication request together with the authentication information (the employee ID and the password). Then, the authentication request part 11 acquires an authentication result (success or failure) from the authentication server 80. The process thereafter depends on whether the authentication result indicates success or failure. Details will be described later with reference to FIG. 10.

In step S607, the authentication request part 11 of the portable terminal 10 transmits a determination request to the connection possibility determination part 13 to determine which one of the plurality of sets of the communications information included in the communications information 1000 is to be used to carry out communications with the image forming apparatus 20.

In step S608, the connection possibility determination part 13 of the portable terminal 10 carries out a connection possibility determination process. According to the first embodiment, in the connection possibility determination process, the connection possibility determination part 13 generates any one of the following results. Details of the connection possibility determination process will be described later.

(1) The portable terminal 10 cannot carry out communications with the image forming apparatus 20 even using any one of the network N1 and the network N2 (the selection result: communications not possible).

(2) The portable terminal 10 is to carry out communications with the image forming apparatus 20 using the network N1 (the selection result: communications with the first communications part (151)).

(3) The portable terminal 10 is to carry out communications with the image forming apparatus 20 using the network N2 (the selection result: communications with the second communications part (152)).

If the selection result from the connection possibility determination part 13 is the above-mentioned result (1), the connection possibility determination part 13 carries out step S609. If the selection result from the connection possibility determination part 13 is the above-mentioned result (2), the connection possibility determination part 13 carries out step S611. If the selection result from the connection possibility determination part 13 is the above-mentioned result (3), the connection possibility determination part 13 carries out step S614.

In step S609, the connection possibility determination part 13 of the portable terminal 10 transmits a display request to the UI display part 14 to display a screen page (a communications not-possible screen page of FIG. 12B) indicating that communications with the image forming apparatus 20 is not possible.

In step S610, when the UI display part 14 of the portable terminal 10 receives the request to display the communications not-possible screen page, it generates the communications not-possible screen page, and displays it on the display unit 102. Thus, it is reported to the user that the portable terminal 10 that the user operates cannot carry out communications with the image forming apparatus 20.

In step S611, the connection possibility determination part 13 of the portable terminal 10 transmits the print job execution request to the first communications part 151.

In step S612, when the first communications part 151 of the portable terminal 10 receives the print job execution request, it transmits the print job execution request to the image forming apparatus 20. That is, the portable terminal 10 transmits the print job to the image forming apparatus 20 via the network N1 (for example, an intracompany LAN connected via a radio LAN).

In step S613, when the print function part 21 of the image forming apparatus 20 receives the print job from the portable terminal 10, it executes the print job to print the print target data. Thus, the user can print the desired print target data using the image forming apparatus 20.

In step S614, the connection possibility determination part 13 of the portable terminal 10 transmits the print job execution request to the second communications part 152.

In step S615, when the second communications part 152 of the portable terminal 10 receives the print job execution request, it transmits the print job execution request to the image forming apparatus 20. That is, the portable terminal 10 transmits the print job to the image forming apparatus 20 via the network N2 (for example, via P2P using Wi-Fi Direct).

In step S616, when the print function part 21 of the image forming apparatus 20 receives the print job from the portable terminal 10, it executes the print job to print the print target data. Thus, the user can print the desired print target data using the image forming apparatus 20.

Thus, in the printing system 1 according to the first embodiment, the portable terminal 10 acquires, from the information medium 30, the plurality of sets of the communications information for carrying out communications with the image forming apparatus 20. Then, after the portable terminal 10 is authenticated that the user is an employee, the portable terminal 10 can carry out communications with the image forming apparatus 20 based on one of the plurality of sets of the communications information and carry out printing through the image forming apparatus 20. That is, the portable terminal 10 can carry out printing through the image forming apparatus 20, by selecting one of the plurality of networks connected to the image forming apparatus 20 and transmitting the print job to the image forming apparatus 20 via the selected network.

<<Authentication Result and Connection Possibility Determination Process>>

Next, with reference to FIGS. 10-12B, the connection possibility determination process of step S608 in response to the authentication result of step S606 in the printing process described above will be described. In the connection possibility determination process, it is determined whether the first communications information 1100 or the second communications information 1300 included in the communications information 1000 acquired by the information acquisition part 12 is used to carry out communications with the image forming apparatus 20. In other words, in the connection possibility determination process, it is determined which one of the plurality of networks connected to the image forming apparatus 20 is used to carry out communications.

Figure 10:
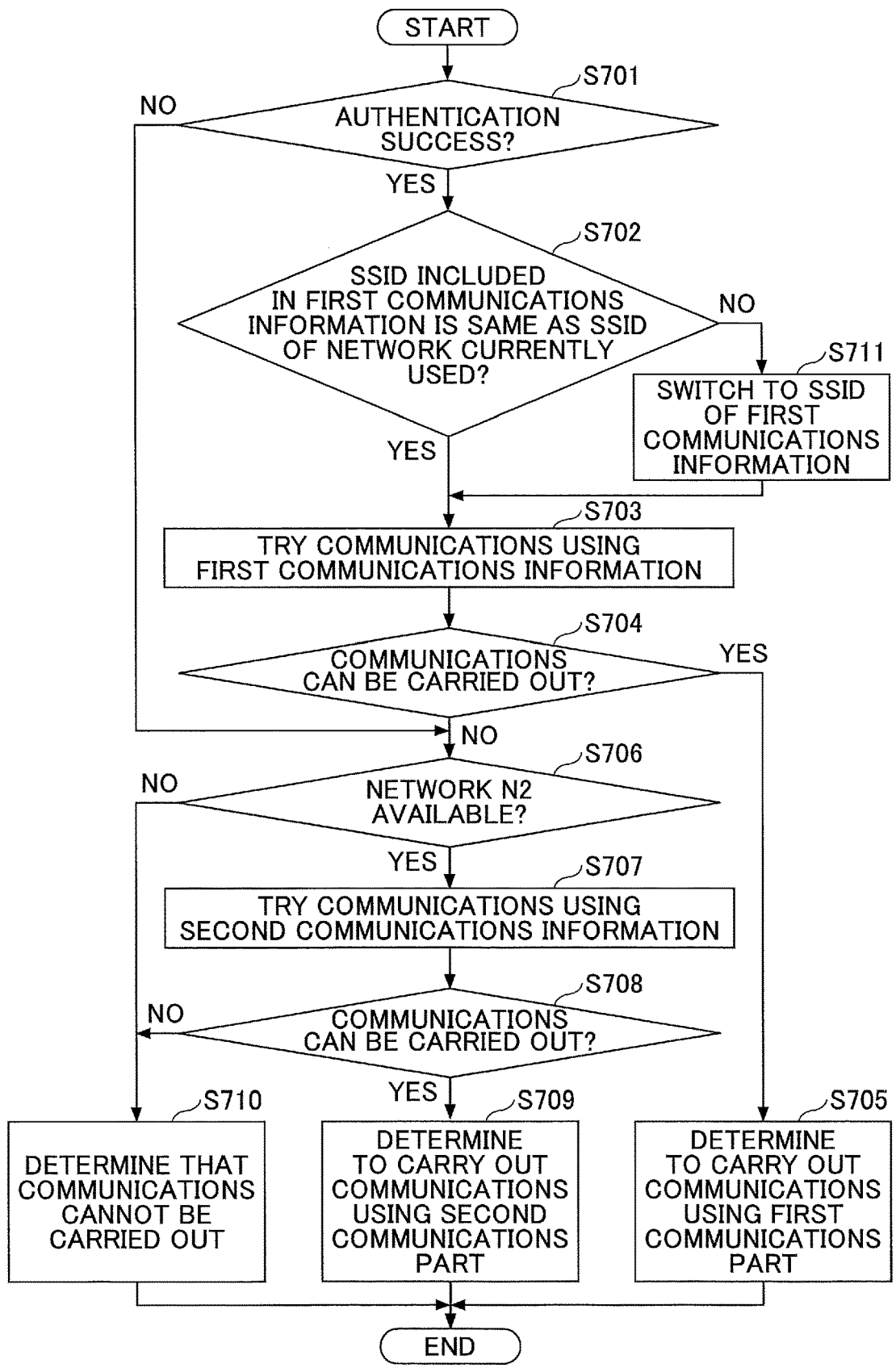
FIG. 10 is a flowchart of one example of a connection possibility determination process.

FIG. 10 is a flowchart of one example of the connection possibility determination process according to the first embodiment. FIGS. 11A, 11B, 12A and 12B illustrate examples of screen pages of the application of the portable terminal 10 displayed on the display unit 102. Now, a flow of a process of FIG. 10 will be described with reference to FIGS. 11A, 11B, 12A and 12B.

Figure 11A:
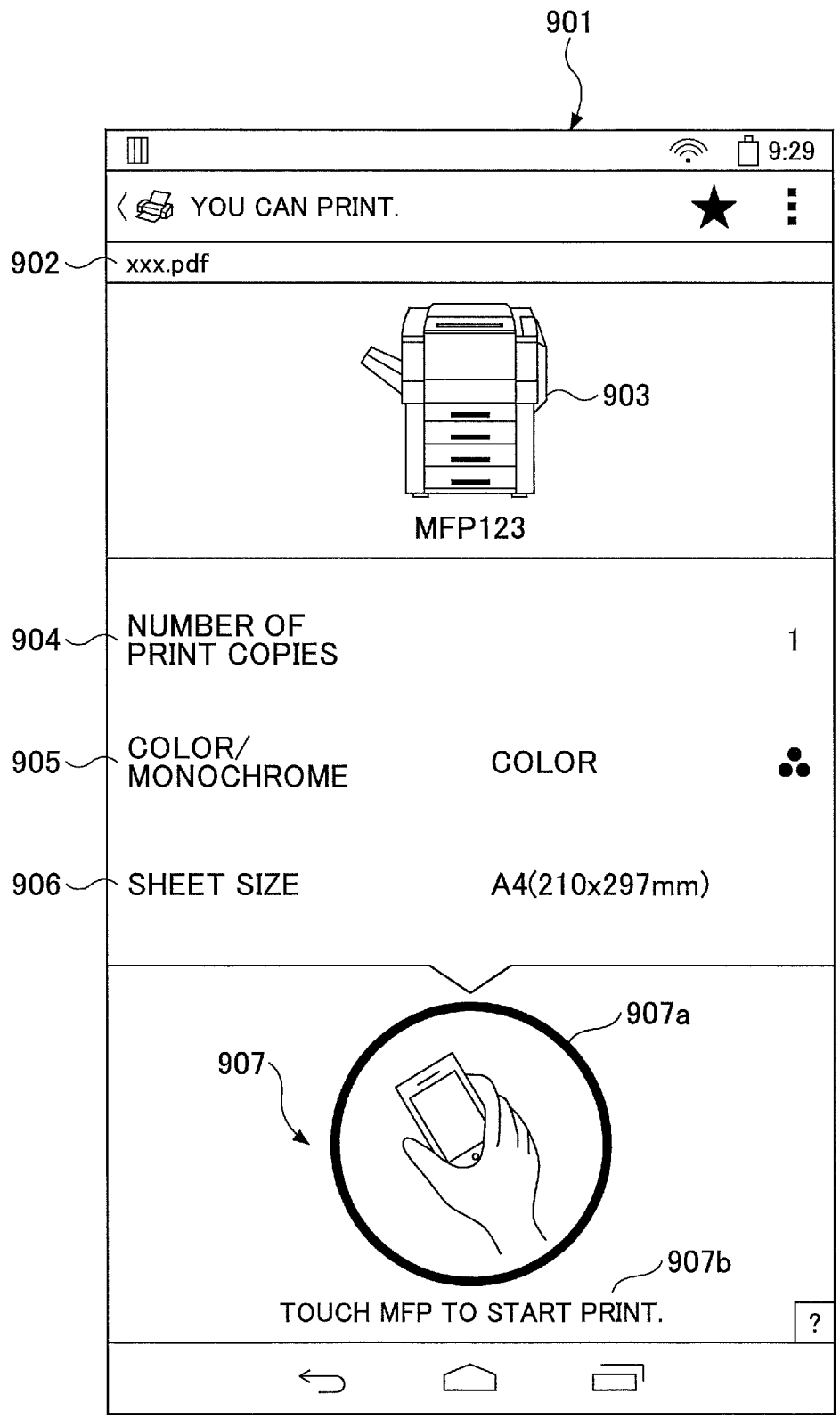
FIGS. 11A, 11B, 12A, and 12B illustrate examples of screen page examples of an application displayed on a display unit of the portable terminal.

First, the user selects print target data from a list of print target data, or the like, displayed by the application on the display unit 102. As a result, as shown in FIG. 11A, a print condition screen page 901 is displayed on the display unit 102 of the portable terminal 10. The print target data 902, an icon 903 of the image forming apparatus 20, the number of print copies 904, color/monochrome 905, and, the sheet size 906 are displayed in the print condition screen page 901. Initial setting values that are previously set to the application or setting values that are set by the user most recently are displayed for the number of print copies 904, color/monochrome 905, and, the sheet size 906. Therefore, the user can perform printing with the desired setting values (the printing conditions) with minimized setting changes, when performing printing through the image forming apparatus 20 from the portable terminal 10.

A how-to-use advice 907 includes, for example, an icon 907*a*, and a message 907*b* "touch MFP to start print", to urge the user to put the portable terminal 10 over the position of the short-range wireless communications unit 301 (the NFC chip) of the image forming apparatus 20. As a result of putting the portable terminal 10 over the position of the short-range wireless communications unit 301, the information acquisition part 12 of the portable terminal 10 acquires the communications information 1000 from the information medium 30. After the communications information is thus acquired, the process of FIG. 10 is started.

In step S701 of FIG. 10, the authentication request part 11 of the portable terminal 10 determines whether the authentication result acquired from the authentication server 80 indicates authentication success. The actual determination method will now be described for each use case described above. In use case 1 where the user is a visitor 9, the portable terminal 10 cannot connect to the access point 6. Thus, the portable terminal 10 cannot acquire the authentication result from the authentication server 80 (for example, the employee of the company B uses the image forming apparatus 20 installed in the company A). The above-mentioned employee 8 of the company C also cannot connect to the access point 6 in use case 1. However, if the employee ID and the password have not been input to the portable terminal 10 (i.e., if no input is performed onto the authentication information input screen page 941), the authentication request part 11 does not try to send an authentication request to the authentication server 80, and regards that the authentication result is authentication failure. Thus, it is possible to omit communications for authentication.

In use case 2 where the user is an employee (i.e., the above-mentioned employee of the company A), a case can be considered where the portable terminal 10 connects to the authentication server 80 via the access point 6, and cannot acquire an authentication result, in many cases. In this case, based on the authentication connection information 900 included in the communications information 1000, an authentication request is sent to the authentication server 80 via the network N3, and an authentication result is acquired. If the authentication result indicates authentication success, the process proceeds to step S702. If the authentication result indicates authentication failure, the process proceeds to step S706.

Thus, as a result of the authentication server 80 determining whether to authenticate the user, it is possible to prevent the user other than the employees from connecting to the network N1 that is the intracompany LAN. Also, as a result of the employee 8 being authenticated, communications with the image forming apparatus 20 is carried out via the network N1 that is the intracompany LAN. Thus, the employee 8 can carry out communications under the communications environment with high security. Also, it is possible to prevent users other than the employees from trying to connect to an IP address included in the network N1 to which users other than the employees cannot connect. Thus, it is possible to avoid occurrence of unnecessary communications.

Returning to FIG. 10, the connection possibility determination part 13 then determines whether the SSID included in the first communications information is the same as the SSID of the network used for the currently carried out communications (S702). If the SSID is different therebetween, the communications switching control part 18 switches the network connected by the portable terminal 20 to the network identified by the first communications information 1100 (S711). If the SSID and the password included in the first communications information 1100 are encrypted, the SSID and the password can be decrypted as a result of acquiring information for decryption (decryption key) from the authentication server 80, or the SSID and the password can be decrypted as a result of using information for decryption (decryption key or the like) previously stored in the portable terminal 10. If the information for decryption is previously stored in the portable terminal 10, it is preferable, from a security viewpoint, to delete the first communications information 1100 including the SSID, in case of authentication failure.

In step S703 of FIG. 10, because the user is authenticated as being the employee 8, the connection possibility determination part 13 of the portable terminal 10 requests the first communications part 151 to carry out communications with the image forming apparatus 20 via the network N1, based on the first communications information 1100 included in the communications information 1000. Then, the first communications part 151 tries communications with the image forming apparatus 20 using the first communications information 1100. Because the electric waves of the communications spreads in the space to reach the image forming apparatus 20 and the access point 7, the first communications part 151 tries communications with the apparatus (in this case, the image forming apparatus 20) indicated by the first IP address included in the first communications information 1100. If the portable terminal 10 is permitted to carry out communications using 3G or LTE, communications with the apparatus indicated by the first IP address may be tried via a base station of the corresponding carrier.

Figure 11B:
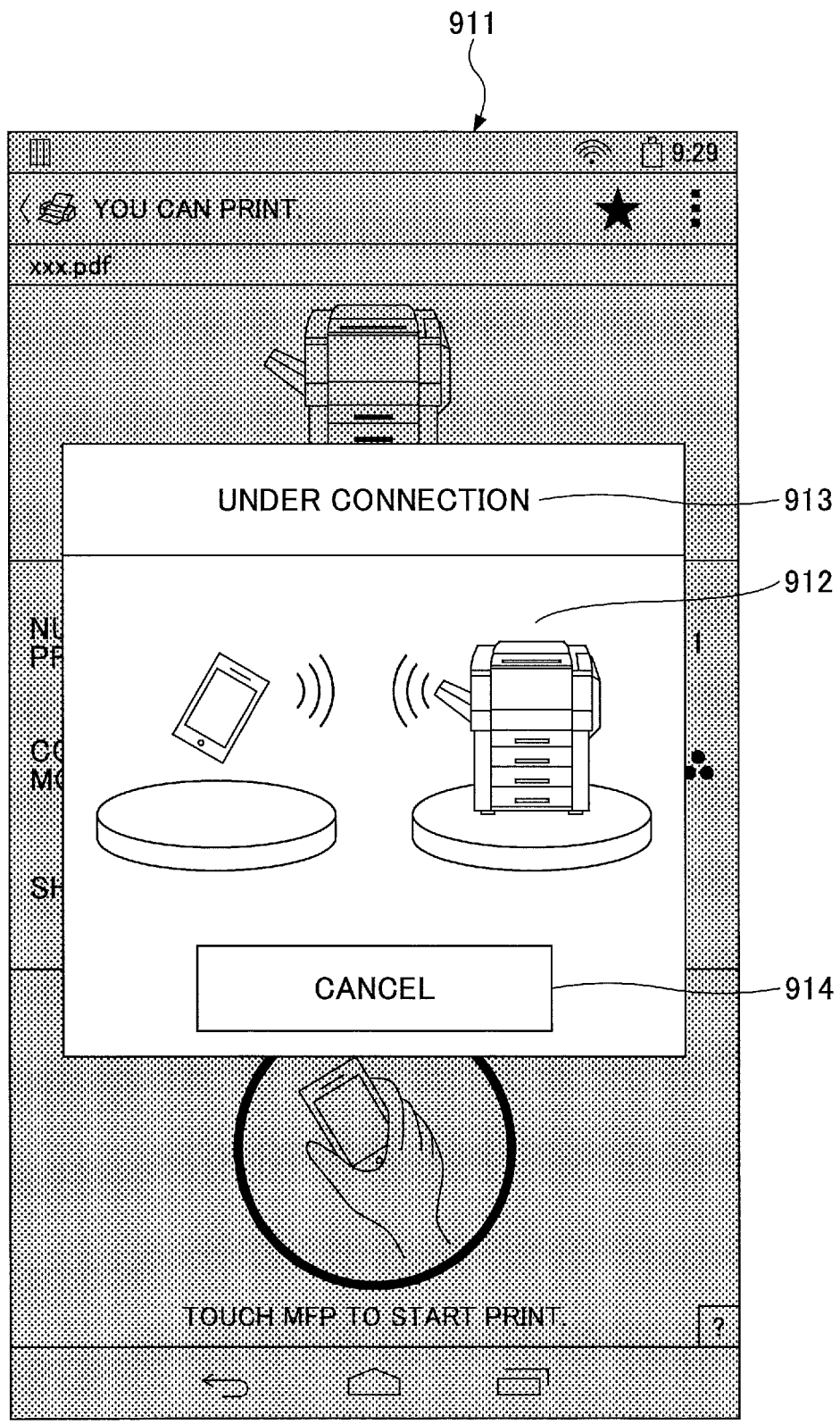

During the period of time during which the first communications part 151 is thus trying communications with the image forming apparatus 20, an under-connection screen page 911 shown in FIG. 11B is displayed on the display unit 102 of the portable terminal 10. The under-connection screen page 911 indicates that the portable terminal 10 is under connection, with an icon 912 and a message 913. Also, a CANCEL button 914 for the user to stop/cancel the connection or the print job is displayed.

Returning to FIG. 10, in step S704, the connection possibility determination part 13 of the portable terminal 10 determines, based on the result of communications having been carried out by the first communications part 151, whether communications with the image forming apparatus 20 via the network N1 can be carried out. If communications with the image forming apparatus 20 via the network N1 can be carried out, the process proceeds to step S705. If communications with the image forming apparatus 20 via the network N1 cannot be carried out, the process proceeds to step S706.

The connection possibility determination part 13 determines, using the first communications information 1100, whether communications with the image forming apparatus 20 can be carried out, as follows. For the purpose of convenience, the description will be made for each use case.
Use Case 1

The portable terminal 10 of the visitor 9 cannot be authenticated in step S701 (authentication failure). Therefore, in use case 1, it is not determined in step S704 whether communications is possible.
Use Case 2

It can be considered that, in many cases, the portable terminal 10 of the employee 8 can carry out communications with the image forming apparatus 20 using the first communications information 1100. In this case, for example, the determination is made using one of the following methods (1) through (3).

(1) The first communications part 151 tries to acquire MIB (Management Information Base) information of the image forming apparatus 20 via the network N1. If the MIB information can be acquired, it is determined that communications with the image forming apparatus 20 can be carried out. If the MIB information cannot be acquired, it is determined that communications with the image forming apparatus 20 cannot be carried out. The MIB information can be standard MIB or extended MIB. If the standard MIB can be acquired, it can be determined that data communications with at least a certain apparatus (that may be the image forming apparatus 20) can be carried out. If the extended MIB can be acquired, it can be determined that data communications with the image forming apparatus 20 expected by the application of the portable terminal 10 can be carried out. Note that the application is created for the image forming apparatuses 20 of a specific manufacturer or a specific apparatus type. Even if the MIB information can be acquired, the apparatus information included in the acquired MIB information may be different from the apparatus information (for example, included in the communications information 1000 acquired from the information medium 30) of the image forming apparatus 20, with which communications is to be carried out. In such a case, a determination that communications cannot be carried out can be made. Thus, the connection possibility determination part 13 can positively determine that communications with the image forming apparatus 20 that has the information medium 30, from which the communications information 1000 is read, can be carried out. The "apparatus information" is information, for example, to be used to uniquely identify the image forming apparatus 20, such as a manufacture unique number (serial number), a MAC (Media Access Control) address, or the like, of the image forming apparatus 20.

(2) The first communications part 151 uses a WebAPI (Web Application Programming Interface) provided by the image forming apparatus 20 to try to acquire the apparatus information via the network N1. The WebAPI is a rule to be used when apparatuses A and B carry out a process via a network (a method of requesting the process, a method of designating data, and/or the like). The information storage part 16 of the portable terminal 10 previously stores the WebAPI. Then, if the apparatus information can thus be acquired, it is determined that communications with the image forming apparatus 20 can be carried out. If the apparatus information cannot be acquired, it is determined that communications with the image forming apparatus 20 cannot be carried out. That is, if the WebAPI is not unique to the manufacturer of the image forming apparatus 20, it can be determined that data communications can be carried out with at least a certain apparatus (that may be the image forming apparatus 20). If the WebAPI is unique to the manufacturer of the image forming apparatus 20, it can be determined that, because the apparatus information can be acquired, data communications with the image forming apparatus 20 expected by the application of the portable terminal 10 can be carried out. Even if the apparatus information can be acquired, the acquired apparatus information may be different from the apparatus information of the desired image forming apparatus 20. In such a case, a determination that communications cannot be carried out can be made. Thus, the connection possibility determination part 13 can positively determine that communications with the image forming apparatus 20 having the information medium 30 can be carried out, from which the communications information 1000 is read.

(3) The first communications part 151 tries to acquire the MAC address of the image forming apparatus 20 using an ARP (Address Resolution Protocol) via the network N1. Then, if the MAC address can be acquired, it is determined that communications with the image forming apparatus 20 can be carried out. If the MAC address cannot be acquired, it is determined that communications with the image forming apparatus 20 cannot be carried out. If the MAC address can be acquired, it can be determined with high accuracy that the apparatus (the image forming apparatus 20) having the IP address stored in the information medium 30 is present, and data communications can be carried out with the image forming apparatus 20 that has the information medium 30. Even if the MAC address can be acquired, the acquired MAC address may be different from the MAC address (acquired from the information medium 30) of the image forming apparatus 20. In such a case, a determination that communications cannot be carried out can be made. Thus, the connection possibility determination part 13 can positively determine that communications with the image forming apparatus 20 can be carried out, at which the information medium 30 is placed.

Also in use case 2, there is a situation, as a rare case, where a packet transmitted by the portable terminal 10 of the employee 8 cannot reach the image forming apparatus 20. As such a situation, there may be a case where the power of a router on the path from the access point 7, nearest from the portable terminal 10, to the image forming apparatus 20 is turned off, the IP address of the image forming apparatus 20 has been changed but the change is not reflected in the information medium 30, or the like.

In such a case, the connection possibility determination part 13 determines that communications with the image forming apparatus 20 using the first communications information 1100 cannot be carried out, by detecting a time-out, a communications error (for example, a status code of 400 is returned in HTTP), or the like.

If a communications error or the like is detected, a retry may be carried out. If it is determined through one of the above-mentioned methods (1) through (3) that communications cannot be carried out, a determination that communications cannot be carried out can be made after a trial is made once.

Also in a case where communications is tried using 3G or LTE, a time-out or a communications error is detected in the same way.

If the SSID cannot be switched in step S711 (for example, when the first communications information 1100 does not include the password and the portable terminal 10 has not been connected to the intracompany LAN until now, the portable terminal 10 does not store the password, and thus, it cannot be connected to the network N1), a determination that communications cannot be carried out can be made without carrying out the above-mentioned methods (1) through (3).

In step S705, if it is determined in step S704 that communications with the image forming apparatus 20 via the network N1 can be carried out, the connection possibility determination part 13 of the portable terminal 10 determines to carry out communications with the image forming apparatus 20 via the network N1 based on the first communications information 1100 included in the communications information 1000.

Figure 12A:
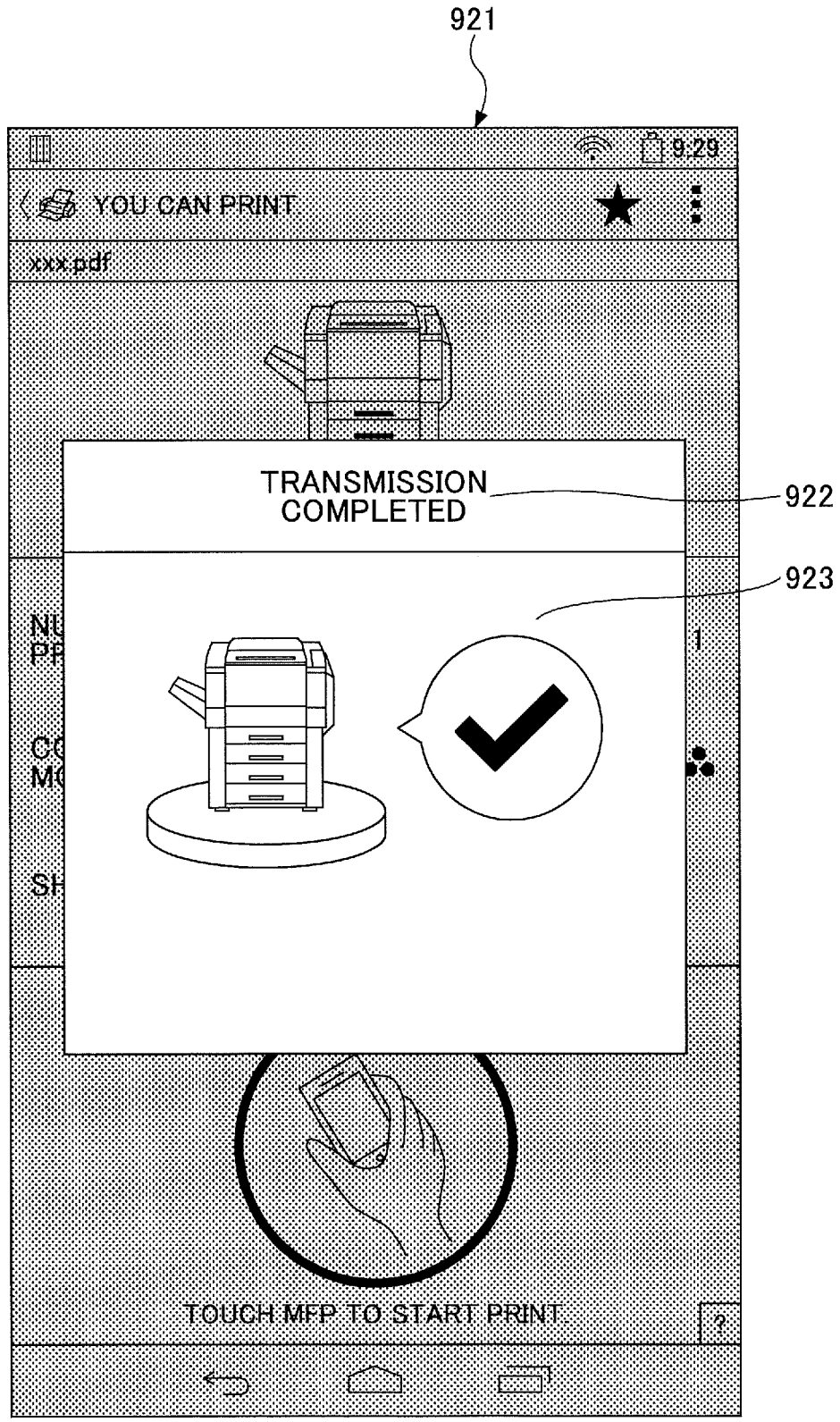

In this case, as shown in FIG. 12A, on the display unit 102 of the portable terminal 10, a transmission completion screen page 921 is displayed. The transmission completion screen page 921 indicates that transmission of the print job from the portable terminal 10 to the image forming apparatus 20 is completed. The transmission completion screen page 921 includes a message 922 "transmission completed" and an icon 923 showing that transmission is completed. The transmission completion screen page 921 is automatically deleted after being displayed for a predetermined period time, and then, the print condition screen page 901 of FIG. 11A is displayed. Alternatively, the print condition screen page 901 of FIG. 11A can be displayed as a result of the user pressing (touching) the icon 923.

Returning to FIG. 10, if, in step S701, authentication failure is acquired, or, if, in step S704, it is determined that communications cannot be carried out, the process proceeds to step S706.

In step S706, the connection possibility determination part 13 of the portable terminal 10 reads the availability information 1200 included in the communications information 1000, and determines whether the network N2 is available. If the network N2 is available, the process proceeds to step S707. If the network N2 is not available, the process proceeds to step S710.

Through the determination in step S706, even if, for example, the network N2 can connect between the portable terminal 10 and the image forming apparatus 20 through P2P such as Wi-Fi Direct, it can be determined whether a connection using P2P is permitted. This is because, the user is charged for usage fee as mentioned above, or, generally speaking, there is a tendency that a connection using P2P has lower security or the like than a connection via an intracompany LAN using a wireless LAN. That is, it is possible that, when the portable terminal 10 of the employee 8 cannot connect to the network N1, the employee 8 is prevented from carrying out a connection using P2P even temporarily. Thus, by carrying out the determination in step S705, it is possible to improve the security.

In step S707, the connection possibility determination part 13 of the portable terminal 10 compares the SSID included in the second communications information 1300 with the SSID of the network currently used for communications, and switches the currently used network to the SSID included in the second communications information 1300 if both SSIDs are different from one another.

Thereafter, the connection possibility determination part 13 of the portable terminal 10 requests the second communications part 152 to carry out communications with the image forming apparatus 20 via the network N2 based on the second communications information 1300 included in the communications information 1000. Then, the second communications part 152 tries to carry out communications with the image forming apparatus 20 via the network N2 based on the second communications information 1300. That is, the second communications part 152 tries to carry out communications with the image forming apparatus 20 indicated by the second IP address included in the second communications information 1300.

In step S708, the connection possibility determination part 13 of the portable terminal 10 determines based on the result of communications thus carried out by the second communications part 152 whether communications with the image forming apparatus 20 via the network N2 can be carried out. If communications with the image forming apparatus 20 via the network N2 can be carried out, the process proceeds to step S709. If communications with the image forming apparatus 20 via the network N2 cannot be carried out, the process proceeds to step S710. Also during the determination of step S708, the under-connection screen page of FIG. 11B is displayed continuously.

The connection possibility determination part 13 determines, using the second communications information 1300, whether communications with the image forming apparatus 20 can be carried out, as follows. In the determination of step S708, a determination is made in the same way for both use cases 1 and 2.

That is, it can be considered that the portable terminal 10 of the visitor 9 and the portable terminal 10 of the employee 8 can transmit and receive packets to/from the image forming apparatus 20 using the second communications information 1300. Therefore, for example, it is possible to make the determination using the above-mentioned determination criteria (1) through (3) of step S704.

Even it is a rare case, there may be a case where, because the power is not supplied to the communications I/F 204 of the image forming apparatus 20, or the communications I/F 204 has a communications failure, the portable terminal 10 cannot transmit and receive packets to and from the image forming apparatus 20 via the network N2. In this case, the connection possibility determination part 13 determines that communications with the image forming apparatus 20 using the second communications information 1300 cannot be carried out, by detecting a fact that no response can be received from the image forming apparatus 20, a time-out, or a communications error, or the like.

In step S708, if it is determined that communications with the image forming apparatus 20 via the network N2 can be carried out, the connection possibility determination part 13 of the portable terminal 10 determines, to carry out communications with the image forming apparatus 20 via the network N2 based on the second communications information 1300 included in the communications information 1000 (step S709).

In this case, on the display unit 102 of the portable terminal 10, the transmission completion screen page 921 of FIG. 12A is displayed. That is, when the print job is transmitted using either the network N1 or the network N2, the same screen page is displayed. Thus, the user needs not be aware which network is used. Alternatively, which one of the network N1 and the network N2 is used by the portable terminal 10 to transmit the print job can be displayed on the display unit 102. Thereby, the user as the employee 8 can determine whether the intracompany LAN having higher security has been able to be used. In contrast thereto, the user as the visitor 9 can determine that his or her own print job has been transmitted via a P2P network.

Returning to FIG. 10, in step S710, because it is determined that communications with the image forming apparatus 20 cannot be carried out using either the network N1 or the network N2, the connection possibility determination part 13 of the portable terminal 10 determines that communications with the image forming apparatus 20 cannot be carried out.

Figure 12B:
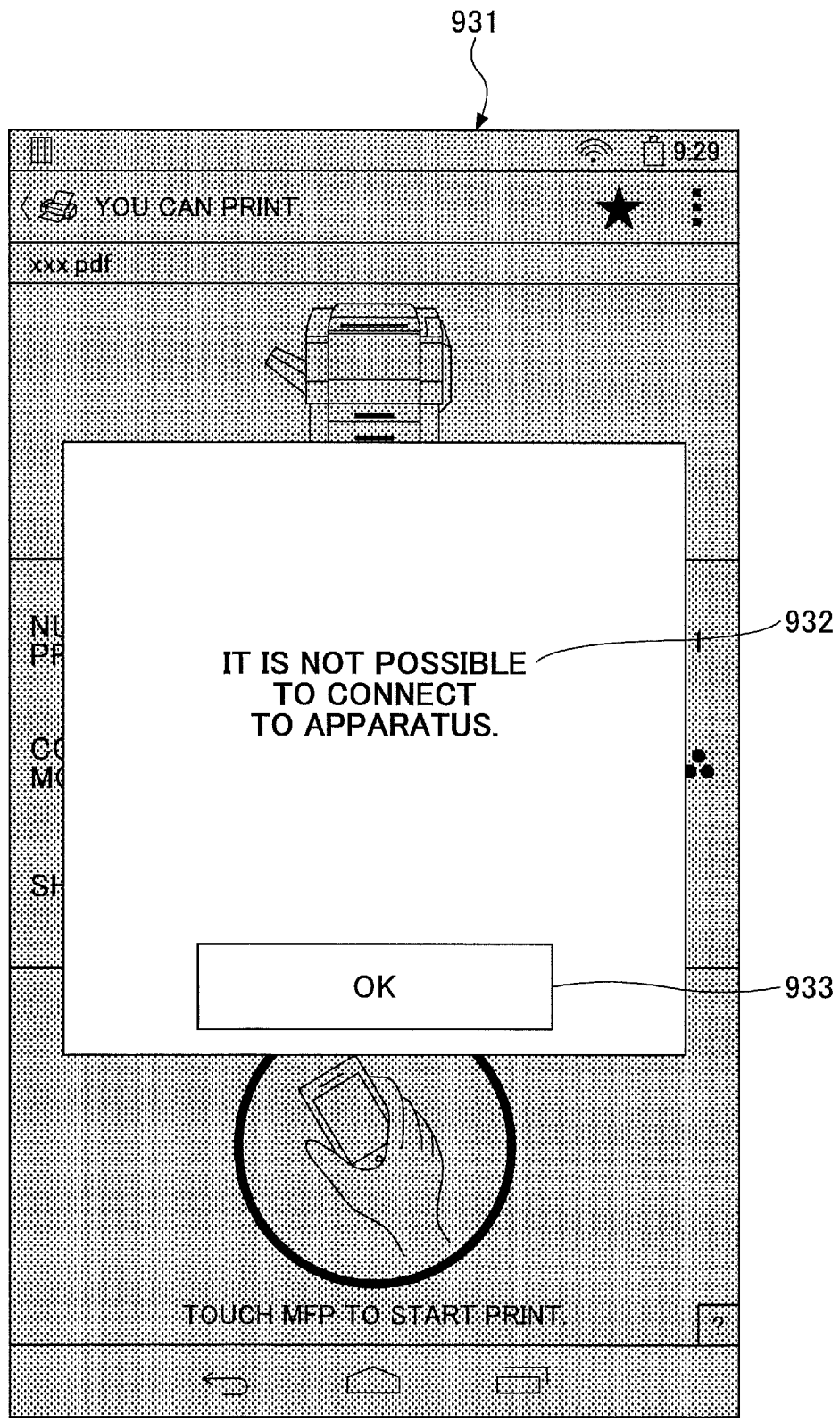

In this case, as shown in FIG. 12B, on the display unit 102 of the portable terminal 10, a communications not-possible screen page 931 is displayed. The communications not-possible screen page 931 includes a message 932 "it is not possible to connect to apparatus" and an OK button 933. If the user presses (touches) the OK button 933, the print condition screen page 901 of FIG. 11A is displayed on the display unit 102.

As described above with reference to FIG. 10, in the printing system 1 of the first embodiment, the user's work to set the first communications information 1100 and the second communications information 1300, for the image forming apparatus 20 connected to the plurality of networks, can be reduced, and also, each user can automatically select the proper network. The employee 8 tries communications using the network N1 first, and, then, tries communications using the network N2 only if the first trial is failed. Therefore, the safer network N1 is preferentially used, and communications using the network N2 is also available. Also, it is possible to prevent the visitor 9 from connecting to the network N1 that is the intracompany LAN, and permit communications using the network N2. Also, by thus switching the network, it is possible to prevent unnecessary communications from occurring which may otherwise occur as a result of the employee 8 trying communications with the IP address written in the first communications information 1100 using a network such as 3G, LTE, or the like, different from the network N1, for which high security is guaranteed.

In other words, it is possible to prevent unnecessary communications which may be problematic from a security viewpoint.

<<Another Example of Communications Information>>

In step S703 of FIG. 10, the connection possibility determination part 13 tries communications with the image forming apparatus 20 using the first communications information 1100. In step S707, the connection possibility determination part 13 tries communications with the image forming apparatus 20 using the second communications information 1300. Thus, the order of the first communications information 1100 and the second communications information 1300 with which a connection is tried is the order (for example, the address order) of the first communications information 1100 and the second communications information 1300 stored in the communications information 1000 of FIGS. 7A and 7B.

A case where the connection possibility determination part 13 first tries communications using the second communications information 1300, and, then, tries communications using the first communications information 1100 if communications cannot be carried out using the second communications information 1300, will now be considered. In this case, if authentication success is acquired (that is, it is determined that the user is an employee 8), communications is tried using the second communications information 1300 first. Thus, the employee 8 can carry out communications using the second communications information 1300. However, the employee 8's always connecting to the network N2 is not desirable. Also, if authentication failure is acquired (that is, it is determined that the user is a visitor 9), the connection possibility determination part 13 tries communications using the first communications information 1100 first. Thus, the visitor 9 cannot connect to the access point 7, and the visitor 9 cannot carry out communications with the image forming apparatus 20 at all. Therefore, the desirable order of trying communications according to the first embodiment is such that the first communications information 1100 for the employees is first, and the second communications information 1300 that visitors can use is second.

From the same viewpoint, if the communications information 1000 includes third communications information, and the third communications information is for the employees, communications is tried therewith desirably prior to the second communications information 1300. If the third communications information can be use by visitors, communications is tried therewith desirably after the first communications information 1100.

In this regard, as a specific method of controlling the order of trying connections, the priority of the communications information can be used.

FIG. 13 illustrates another example of the communications information. In FIG. 13, the first communications information 1100 of the network N1 among the plurality of networks has the priority number "1", and the second communications information 1300 of the network N2 has the priority number "2". If the communications information 1000 thus has the priority numbers for the respective networks (i.e., the respective sets of the communications information), the connection possibility determination part 13 tries communications with the image forming apparatus 20 in the stated order of the first communications information 1100 (the network N1), and then, the second communications information 1300 (the network N2).

Therefore, even if the first communications information 1100 is not stored first in the information medium 30, the order in which the networks are used can be flexibly controlled according to the priority numbers. That is, through control using the priority numbers, a company where the image forming apparatus 20 is installed can give the higher priority to the first communications information 1100 for the employees than the second communications information 1300 that can be used by visitors.

For example, if the communications information 1000 includes third communications information, a company where the image forming apparatus 20 is installed gives the higher priority to the third communications information than the second communications information 1300 if it is for the employees. If the third communications information can be used by visitors, the company gives the lower priority to the third communications information than the first communications information 1100. That is, to the communications information for the employees, the priority number less than a threshold is given. To the communications information that can be used by visitors, the priority number greater than the threshold is given. Note that, the less the priority number is, the higher the priority is.

If the communications information 1000 to which the priority is given is stored in the information medium 30, the connection possibility determination part 13 carries out the following process.

Figure 14:
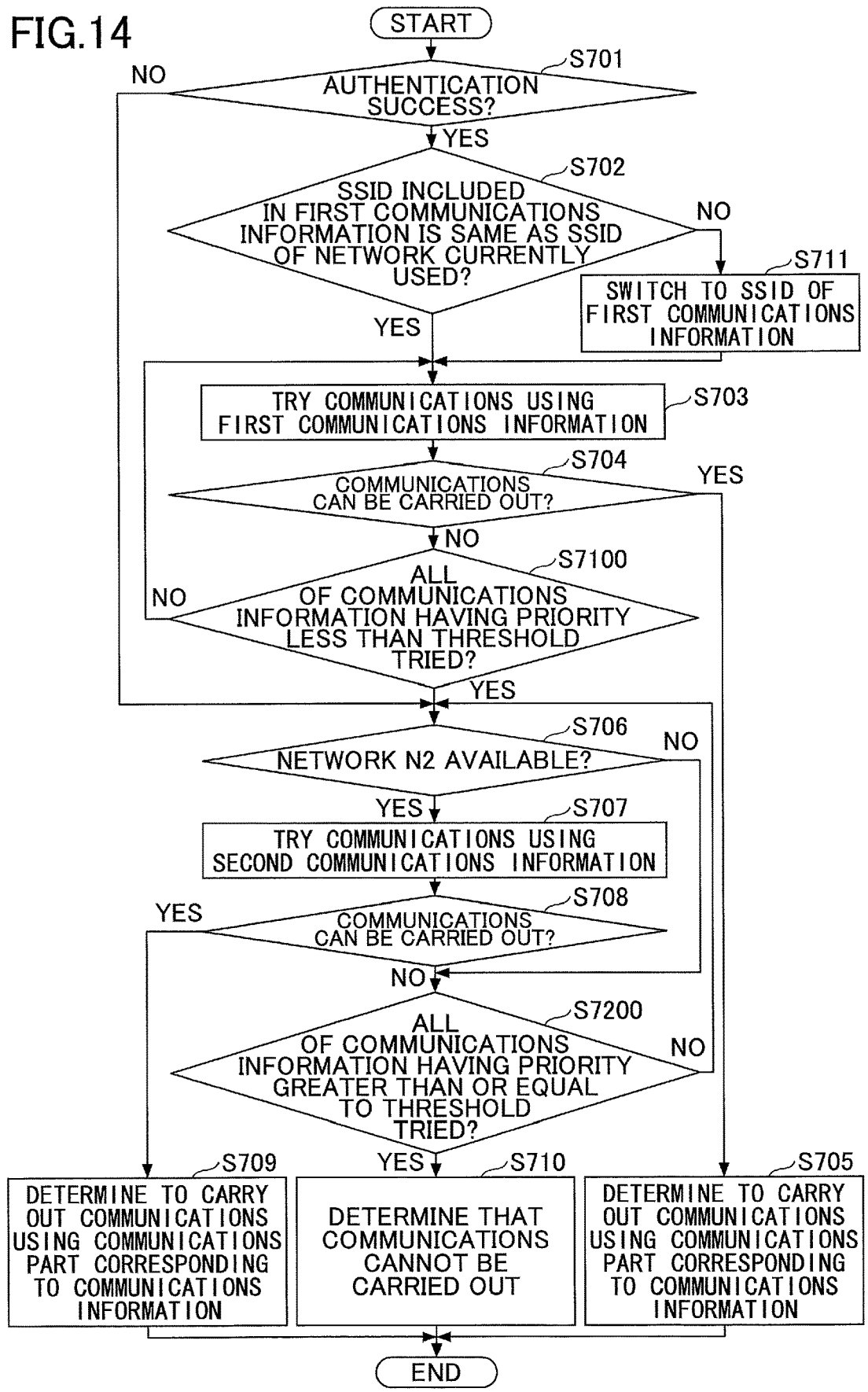
FIG. 14 is a flowchart of one example of a connection possibility determination process using priority.

FIG. 14 is a flowchart of one example of the connection possibility determination process using the priority. Note that, concerning FIG. 14, mainly the differences from FIG. 10 will be described.

In case of authentication success in step S701, all the connections using the communications information having the priority numbers less than a threshold (in the case of the communications information of FIG. 13, threshold=2) are tried in step S7100. The order of trying the connections is the order of the priority. If the communications information is found therefrom with which communications can be carried out, it is determined in step S705 that communications is carried out using the communications part 15 corresponding to the found communications information.

If communications cannot be carried out even using the communications information having the priority numbers less than the threshold, i.e., (YES in S7100), the process proceeds to step S706. In step S706, connections using the communications information having the priority numbers greater than or equal to the threshold are tried in the order of the priority.

In case of authentication failure in step S701, the connections using the communications information having the priority numbers greater than or equal to the threshold are tried in step S7200. The order of trying the connections is the order of the priority. If the communications information is found therefrom with which communications can be carried out, it is determined in step S709 that communications is carried out using the communications part 15 corresponding to the found communications information.

Thus, in the printing system 1, by using the priority, it is possible to connect the employee 8 preferentially to the network N1 that is for the employees, and connect the visitor 9 to the network N2 of P2P.

<<Trial of Communications Based on IP Address>>

Also, it can be determined whether to try to carry out communications with the image forming apparatus 20 using one of the plurality of networks, based on the IP address of the portable terminal 10 and the IP address of the image forming apparatus 20. For example, it will now be assumed that the IP address of the portable terminal 10 is "192.160.0.4", the first IP address of the image forming apparatus 20 in the network N1 is "192.160.0.3", and the second IP address of the image forming apparatus 20 in the network N2 is "192.168.20.1". In this case, the user of the image forming apparatus 20 sets the network N1 having the same sub-network address part "192.160.0.0" to be used to carry out communications using the communications information for the employees, and sets the network N2 to be used to carry out communications using the communications information that can be used by visitors. Thereby, when communications is carried out with the image forming apparatus 20 via the network N1, the communications is within the same sub-net (i.e., within the same LAN), and thus, it is possible to avoid an increase in the network traffic.

Summary of First Embodiment

Thus, in the printing system 1 according to the first embodiment, the portable terminal 10 acquires, from the information medium 30, the authentication connection information 900 for carrying out communications with the authentication server 80, and the plurality of sets of the communications information for carrying out communications with the image forming apparatus 20. Then, the portable terminal 10 is to be authenticated by the authentication server 80 as to whether it belongs to an employee. The portable terminal 10 can determine, according to the authentication result, which of the plurality of sets of the communications information is used to carry out communications with the image forming apparatus 20. That is, according to the authentication result, the portable terminal 10 can select one of the plurality of networks connected to the image forming apparatus 20, transmit the print job to the image forming apparatus 20 via the selected network, and print the corresponding print target data. Therefore, the user can carry out communications using the proper one of the plurality of networks without manually setting the communications information corresponding to the proper network to his or her own portable terminal 10. Thus, it is possible to reduce the management work of the user of the printing system 1.

Second Embodiment

In the first embodiment, the portable terminal 10 carries out communications with the authentication server 80 to be authenticated each time carrying out communications with the image forming apparatus 20. According to a printing system of a second embodiment, as a result of the portable terminal 10 holding only authentication information that has been authenticated by the authentication server 80, communications with the authentication server 80 when carrying out communications with the image forming apparatus 20 is made unnecessary.

Throughout the specification, the elements/components having the same reference numerals have the same or similar functions. Therefore, the descriptions of the elements/components once made may be omitted or only differences may be described.

<Storing Employee ID and Password in Information Storage Part>

Figure 15:
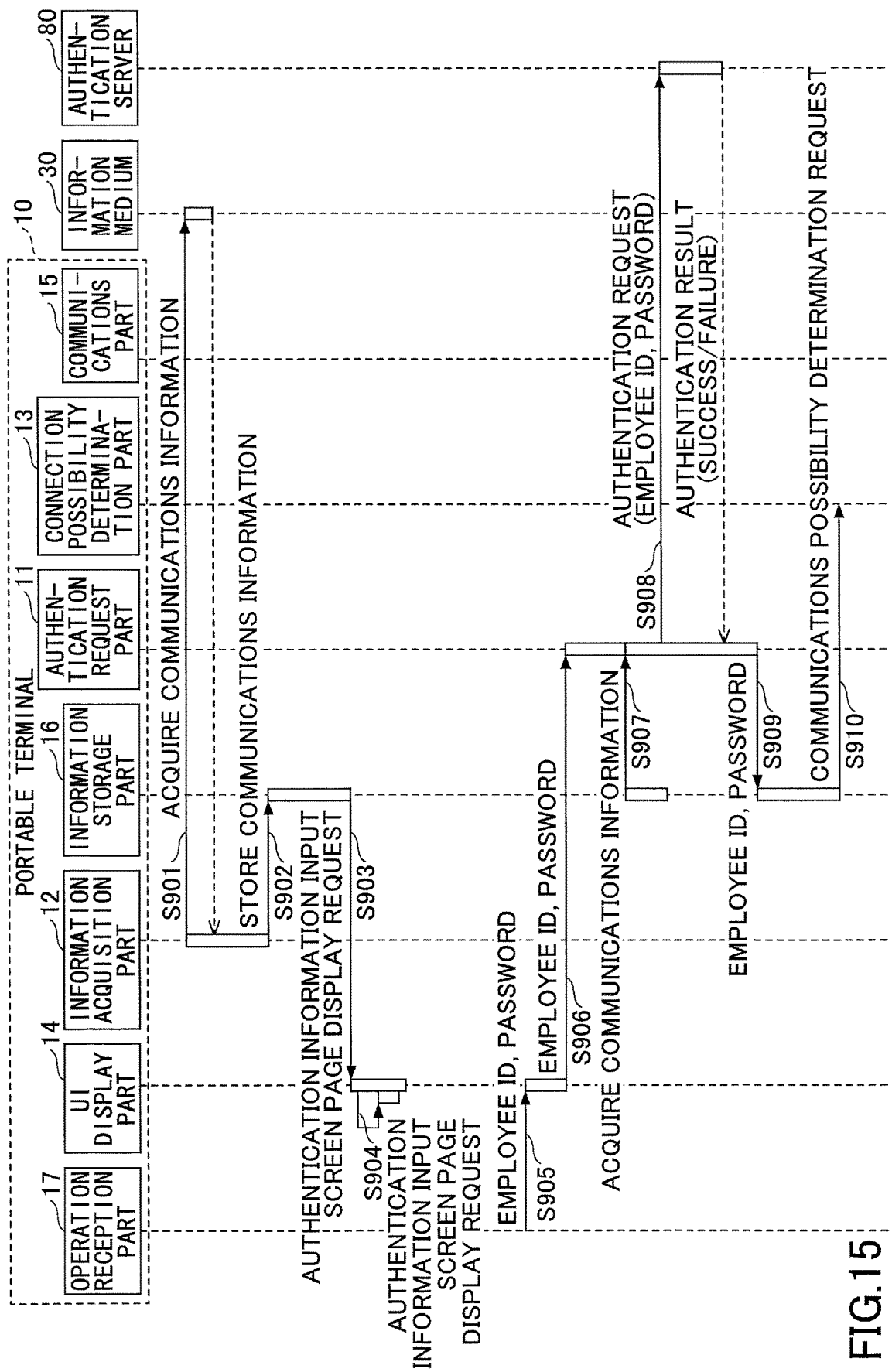
FIG. 15 is a sequence diagram of one example of a procedure for the portable terminal to store an employee ID and a password in an information storage part.

FIG. 15 illustrates a sequence of one example of a procedure of the portable terminal storing the employee ID and the password in the information storage part 16. The process of FIG. 15 is started when the user performs an operation to start the application for being authenticated.

In S901, if the user puts the portable terminal 10 over the information medium 30, the information acquisition part 12 detects the start of short-range wireless communications with the information medium 30, and acquires the communications information 1000 from the information medium 30.

In step S902, the information acquisition part 12 of the portable terminal 10 stores the communications information 1000 acquired from the information medium 30 in the information storage part 16.

In step S903, the information storage part 16 of the portable terminal 10 requests the UI display part 14 to display an authentication information input screen page 941.

In step S904, the UI display part 14 displays the authentication information input screen page 941 on the display unit 102.

In step S905, when the user inputs the employee ID and the password, the operation reception part 17 transmits the employee ID and the password to the UI display part 14.

In step S906, the UI display part 14 transmits the employee ID and the password that are thus input by the user to the authentication request part 11.

In step S907, the authentication request part 11 reads the communications information 1000 from the information storage part 16. Thus, the authentication request part 11 can use the authentication connection information 900 and carry out communications with the authentication server 80. If the user knows the IP address of the authentication server 80, the user can input the IP address of the authentication server 80 to the application without the authentication request part 11 reading the authentication connection information 900.

In step S908, the authentication request part 11 transmits an authentication request together with the employee ID and the password to the authentication server 80. Thus, the authentication request part 11 acquires an authentication result (success or failure) from the authentication server 80.

In step S909, only if the authentication result is authentication success, the authentication request part 11 stores the employee ID and the password in the information storage part 16. Therefore, the information storage part 16 stores the employee ID and the password only if the portable terminal 10 is authenticated. Thereafter, when the portable terminal 10 is to actually carry out communications with the image forming apparatus 20, authentication using the employee ID and the password is no longer necessary. Therefore, what is stored in the information storage part 16 can be information that indicates that authentication is finished, or the like.

In step S910, the information storage part 16 requests the connection possibility determination part 13 to carry out the connection possibility determination process. The process thereafter is in accordance with the process starting from step S608 of the sequence in the first embodiment shown in FIG. 9.

<<Authentication Result and Connection Possibility Determination Process>>

Figure 16:
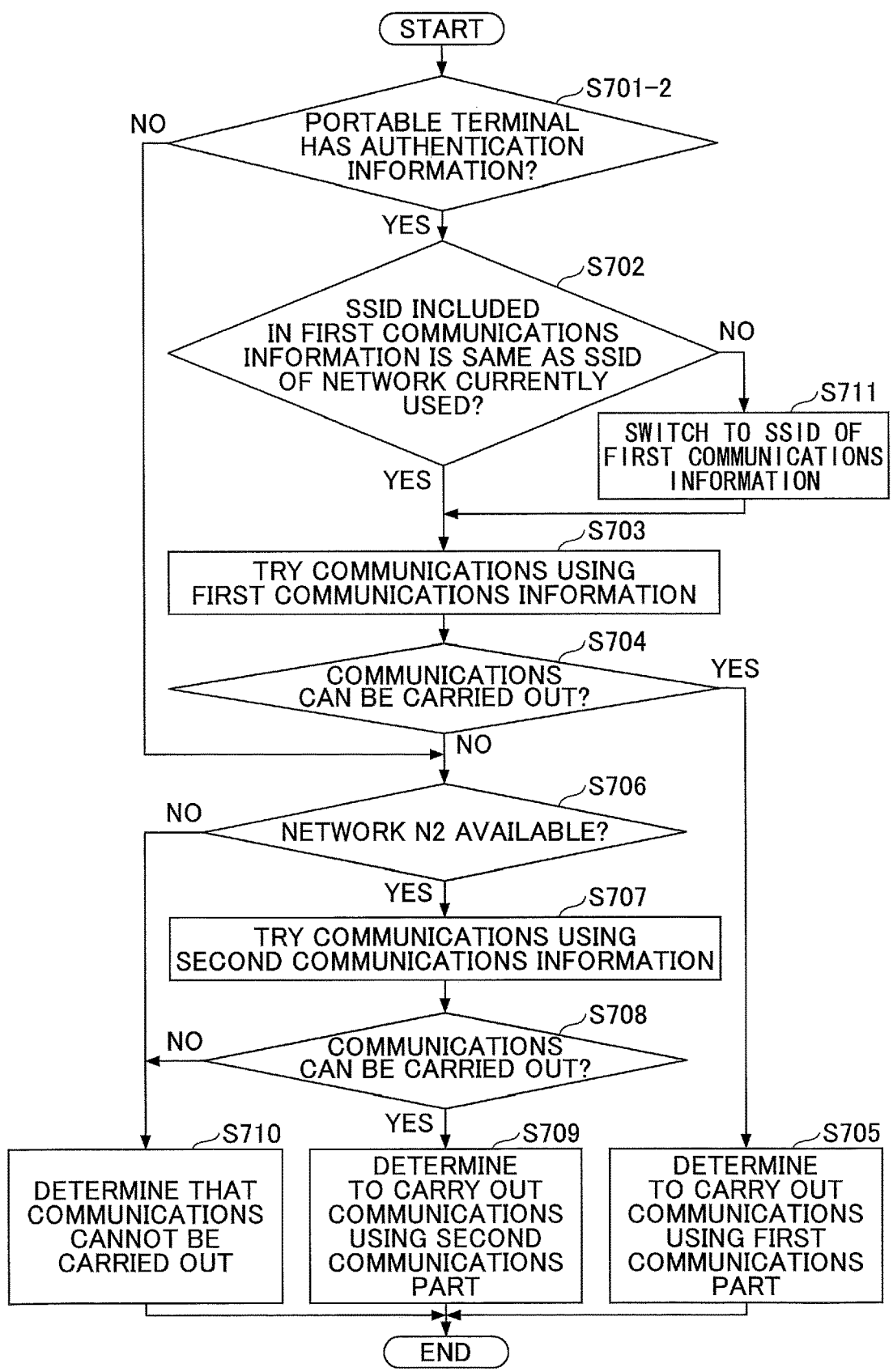
FIG. 16 is a flow chart of one example of a connection possibility determination process (a second embodiment)

With reference to FIG. 16, the connection possibility determination process according to an authentication result will now be described. FIG. 16 is a flowchart of one example of the connection possibility determination process according to the second embodiment. The process starting from step S702 of FIG. 16 is the same as that in FIG. 10, and therefore, the differences therebetween will now be described mainly.

In step S701-2 of FIG. 16, the authentication request part 11 of the portable terminal 10 determines whether the authentication information is stored in the information storage part 16. According to the second embodiment, without regard to use cases, it is determined whether the authentication information is stored in the information storage part 16. For example, in the case of an employee of the company A or B described above for the first embodiment, the determination result of step S701-2 is YES if the user is authenticated by the authentication server 80. However, only with the first communications information 1100, the employee of the company B cannot connect to the network N1 that is the intracompany LAN in the company A. Therefore, it is determined in step S704 that communications cannot be carried out, and the employee of the company B carries out communications via the network N2.

Also, an employee of the company C has not been authenticated by the authentication server 80 yet. Therefore, the determination result of step S701-2 is NO.

Thus, also according to the second embodiment, visitors 9 are prevented from connecting to the network N1 that is the intracompany LAN, and it is possible to connect visitors 9 and employees 8 connect to the proper networks, respectively.

Thus, according to the second embodiment, in addition to the advantageous effects of the first embodiment, because the portable terminal 10 previously stores the authentication information authenticated by the authentication server 80, it is possible to make, no longer necessary, communications with the authentication server 80 when communications with the image forming apparatus 20 is actually carried out.

Third Embodiment

It has been already mentioned above that the image forming apparatus 20 can be an image projection apparatus (projector), or the like, concerning the first embodiment.

A third embodiment will now be described for a case where the image forming apparatus 20 is an image projection apparatus (projector).

Throughout the present specification, elements/components having the same reference numerals have the same or similar functions. Therefore, descriptions for elements/components once made may be omitted or only differences may be described.

Figure 17:
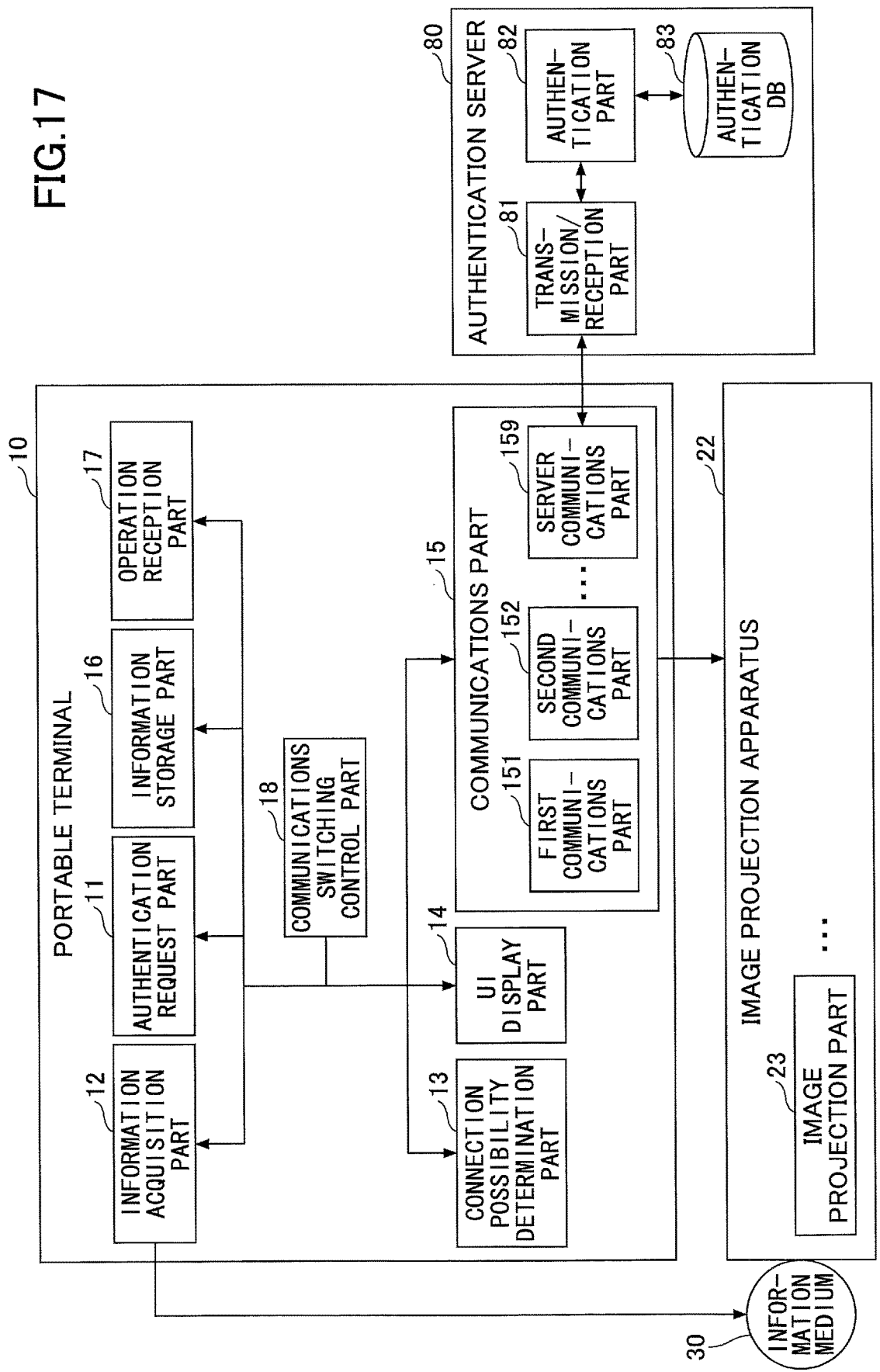
FIG. 17 is a functional block diagram of one example of a projection system (a third embodiment)

FIG. 17 is a functional block diagram of one example of a projection system according to the third embodiment. In FIG. 17, the configuration of the portable terminal 10 is the same as FIG. 6. In contrast thereto, in FIG. 17, the portable terminal 10 carries out communications not with the image forming apparatus 20 but with an image projection apparatus 22. At the image projection apparatus 22, the information medium 30 is placed. The image projection apparatus 22 has an image projection part 23. The information medium 30 is the same as that in the first embodiment.

The image projection apparatus 22 modulates image data according to a DLP (Digital Light Processing) way or a liquid crystal way, and projects an image on a screen or a wall. The image data is transmitted to the image projection apparatus 22 from the portable terminal 10 via the network N1 or N2. The image projection part 23 is implemented by a CPU and a projection engine of a DLP type or a liquid crystal type of the image projection apparatus 22, and generates a projection image based on the given image data.

Figure 18:
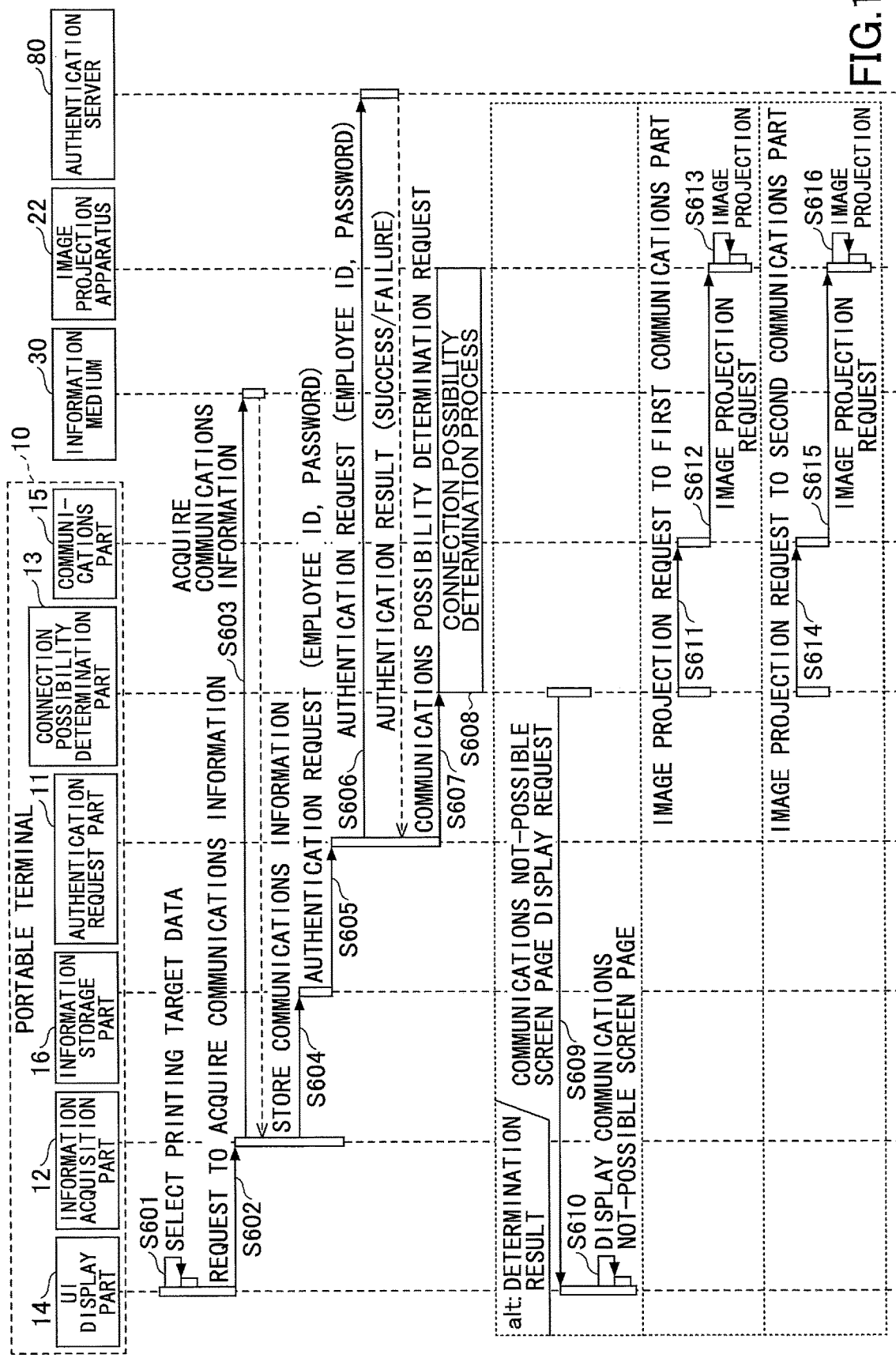
FIG. 18 illustrates a sequence of one example of a projection process (the third embodiment)

FIG. 18 illustrates a sequence of one example of a projection process according to the third embodiment. The process of FIG. 18 is different from the first embodiment in steps S611 through S616 of FIG. 9. Therefore, the processes of steps S611 through S616 will now be described.

In step S611, the connection possibility determination part 13 of the portable terminal 10 transmits the image projection request to the first communications part 151.

In step S612, the first communications part 151 of the portable terminal 10 transmits the image projection request to the image projection apparatus 22 after receiving the image projection request. That is, the portable terminal 10 transmits the image data to the image projection apparatus 22 via the network N1 (for example, an intracompany LAN connected through a wireless LAN). The image data is generated from, for example, an image currently displayed on the display unit 102 of the portable terminal 10, or an image selected by the user.

In step S613, the image projection part 23 of the image projection apparatus 22 projects the corresponding image after receiving the image projection request from the portable terminal 10. Thus, the user can project the desired image through the image projection apparatus 22.

In step S614, the connection possibility determination part 13 of the portable terminal 10 transmits the image projection request to the second communications part 152.

In step S615, the second communications part 152 of the portable terminal 10 transmits the image projection request to the image projection apparatus 22 after receiving the image projection request. That is, the portable terminal 10 transmits the image data to the image projection apparatus 22 via the network N2 (for example, P2P using Wi-Fi Direct).

In step S616, the image projection part 23 of the image projection apparatus 22 projects the corresponding image after receiving the image projection request from the portable terminal 10. Thus, the user can project the desired image through the image projection apparatus 22.

If the portable terminal 10 causes the image forming apparatus 20 to carry out printing in the above-described first embodiment, the portable terminal 10 waits for printing completion after transmitting the print job to the image forming apparatus 20. In contrast thereto, if the portable terminal 10 causes the image projection apparatus 22 to project an image according to the third embodiment, the portable terminal 10 can cause the image projection apparatus 22 to project images a plurality of times.

For example, if the portable terminal 10 updates a static image displayed on the display unit 102 (for example, by switching among a plurality of images, magnifying or reducing in size, changing the area of an image to display, or the like), or the user again selects an image, the portable terminal 10 transmits the corresponding image data to the image projection apparatus 22. If the portable terminal 10 displays a moving image on the display unit 102, the portable terminal 10 periodically takes the image, generates the corresponding image data, and transmits it to the image projection apparatus 22. The format of the image data can be any one such as JPEG, TIFF, GIF, PNG, or the like, as long as the image projection apparatus 22 is capable of processing the corresponding image data.

The portable terminal 10 can transmit a file including an image(s) as it is. For example, a PDF file, a MPEG file, or the like, can be transmitted. In this case, the image projection apparatus 22 projects the image(s) after opening the file and converting the file into the image(s).

In the projection system according to the third embodiment, in addition to the advantageous effects of the first embodiment, it is possible to carry out communications using the proper network of wireless communications from the portable terminal 10, and transmit necessary data such as image data therethrough.

Fourth Embodiment

According to a fourth embodiment, in the printing system 1, the portable terminal 10 creates a server, and the image forming apparatus 20 transmits a request to the server. As a result, the portable terminal 10 acquires the IP address of the image forming apparatus 20 concerning the network N1 or N2.

<Software Configuration>

Figure 19:
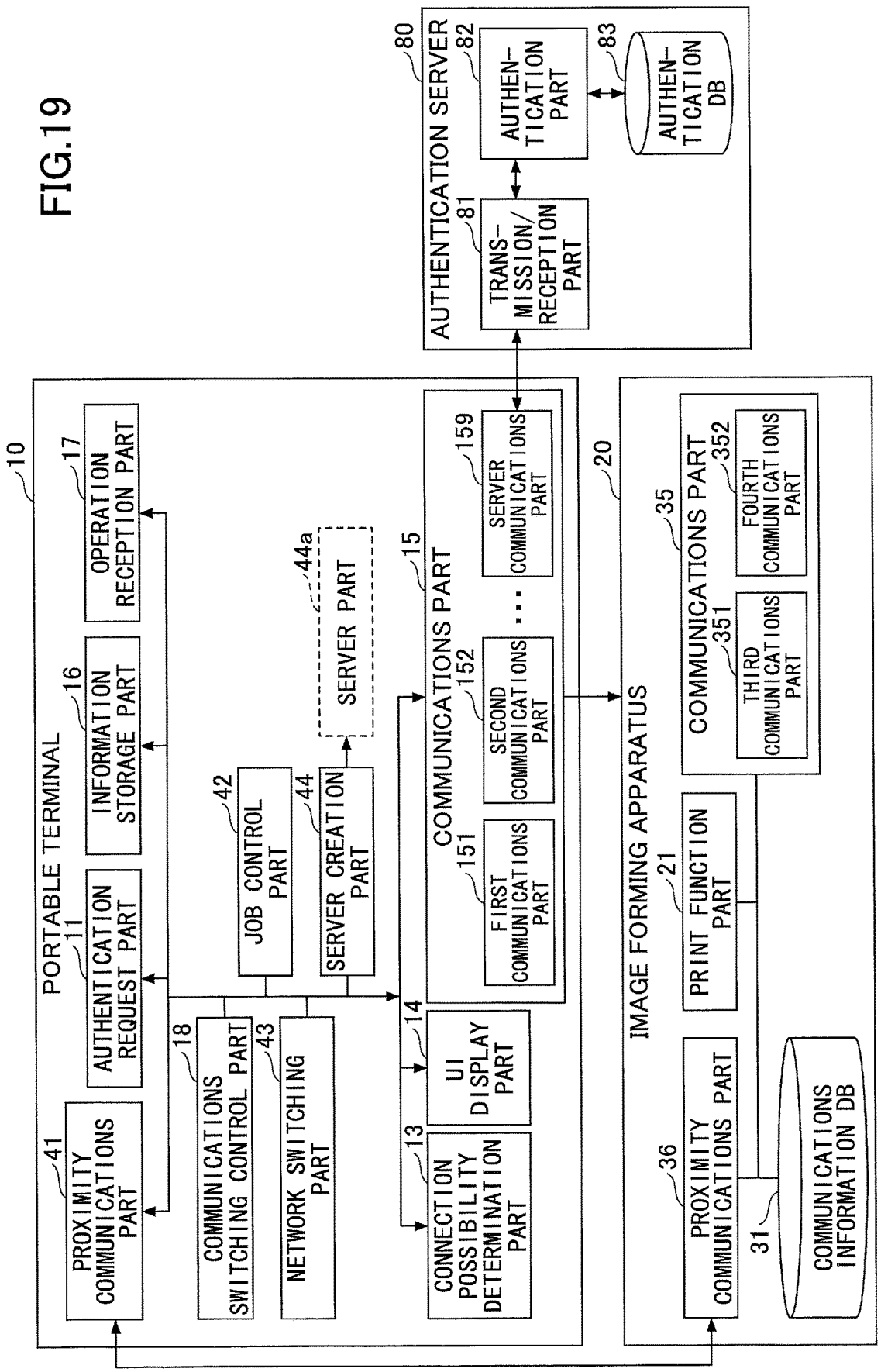
FIG. 19 is a functional block diagram of one example of a printing system (a fourth embodiment)

FIG. 19 is a functional block diagram of one example of the printing system 1 according to the fourth embodiment. According to the fourth embodiment, elements/components having the same reference numerals as those of FIG. 6 have the same or similar functions. Therefore, mainly, characterized features of the fourth embodiment will be described.

<<Functions of Portable Terminal>>

The portable terminal 10 according to the fourth embodiment newly includes a proximity communications part 41, a job control part 42, a network switching part 43, and a server creation part 44. A server part 44a drawn by a broken line in FIG. 19 will be described later.

The proximity communications part 41 is implemented by the CPU 106, the short-range wireless communications unit 109, and so forth, shown in FIG. 3, and carries out wireless communications with the image forming apparatus 20 within a distance of several meters, or so. As will be described later, the proximity communications part 41 receives the communications information 1000, and transmits URL information 5000 that will be described later. The proximity communications part 41 carries out communications according to the communications standard of Bluetooth (registered trademark) Low Energy (hereinafter, simply referred to as "BLE"). The actual communications procedure thereof is known, and therefore, the detailed description will be omitted.

According to the fourth embodiment, the communications information 1000 does not include the IP address of the image forming apparatus 20. One example of the communications information 1000 according to the fourth embodiment is shown below as Table 2.

TABLE 2

| ITEM NAME | ITEM VALUE | 1000 |
|---|---|---|
| AUTHENTICATION SERVER IP ADDRESS | 192.168.0.100 | 900 |
| SSL COMMUNICATIONS | Yes | |
| ... | | |
| SSL COMMUNICATIONS | Yes | 1100 |
| SSID | ABC123 | |
| NETWORK N2 AVAILABILITY | Yes | 1200 |
| SSID | 456DEF | |
| ENCRYPTION METHOD | WPA/WPA2-PSK | |
| PASSWORD | ****** | |
| HTTP PORT NUMBER | 80 | 1300 |
| HTTPS PORT NUMBER | 443 | |
| PORT NUMBER OF SERVER OF PORTABLE TERMINAL | 50000 | |
| ... | | |

In the communications information 1000 of Table 2, the first communications information 1100 does not include the IP address of the image forming apparatus 20, and the second communications information 1300 does not include the IP address of the image forming apparatus 20, either. This is because, the IP address is transmitted to the portable terminal 10 from the image forming apparatus 20 when the image forming apparatus 20 carries out communications with the server part 44a of the portable terminal 10. The second communications information 1300 includes, different from the first through third embodiments, "PORT NUMBER OF SERVER OF PORTABLE TERMINAL". "PORT NUMBER OF SERVER OF PORTABLE TERMINAL" is used for the image forming apparatus 20 to carry out communications with the server part 44a.

The job control part 42 is implemented by the CPU 106, and so forth, shown in FIG. 3, and carries out a process of requesting the image forming apparatus 20 to execute a job such as a printing job.

The network switching part 43 switches the network N1 (or another network, to which the portable terminal 10 currently connects) to the network N2, to which the portable terminal 10 is to connect. Actually, the network switching part 43 creates the second communications part 152, to which the second communications information 1300 is applied (i.e., the second communications information 1300 is set to the second communications part 152). However, depending on the OS of the portable terminal 10, the user's permission or operation can be needed therefor. There is a case where the portable terminal 10 is not connected to networks, at all. In this case, the portable terminal 10 can be connected to the network N2.

The server creation part 44 is implemented by the CPU 106, and so forth, shown in FIG. 3, and creates a server in the portable terminal 10. The created server is the server part 44a. "Creating a server" means preparing a response corresponding to a HTTP (or HTTPS) request. The function of the server part 44a will be described later with reference to FIG. 21. Generally speaking, such a configuration is provided that accessing the portable terminal 10 from the outside (from the image forming apparatus 20, or the like) cannot be carried out, from a security viewpoint. However, by creating the server part 44a, communications with the portable terminal 10 from the outside can be carried out through HTTP communications or the like.

The server creation part 44 creates URL information 5000 to be used to receive communications that is carried out for the created server part 44a. The URL information 5000 includes information for the image forming apparatus 20 to generate a URL of the server part 44a. How to create the URL information 5000 will be described later with reference to FIG. 20. The URL information 5000 is transmitted by the proximity communications part 41 to the image forming apparatus 20.

<<Image Forming Apparatus>>

The image forming apparatus 20 according to the fourth embodiment newly includes a proximity communications part 36, and a communications part 35. The proximity communications part 36 is implemented by the CPU 211, the short-range wireless communications unit 301, and so forth, shown in FIG. 4, and carries out wireless communications with the portable terminals 10 within a distance on the order of serval meters. As will be described later, the proximity communications part 36 receives the URL information 5000, and transmits the communications information 1000.

The communications part 35 includes a third communications part 351 and a fourth communications part 352. The third communications part 351 connects to the network N1 and carries out communications with the portable terminal 10. The fourth communications part 352 connects to the network N2, and carries out communications with the portable terminal 10. The third communications part 351 includes the IP address included in the first communications information 1100 of the first through third embodiments. The fourth communications part 352 includes the IP address included in the second communications information 1300 of the first through third embodiments.

The image forming apparatus 20 includes a communications information DB 31. The communications information DB 31 is created in the HDD 215, the RAM 212, the ROM 213, the NVRAM 214, or the like, shown in FIG. 4. The communications information DB 31 stores the communications information 1000 of Table 2.

Concerning the fourth embodiment, a description will be made assuming that the short-range wireless communications units 109 and 301 carry out communications using BLE. However, the short-range wireless communications units 109 and 301 can be NFC reader/writers, or devices that are capable of carrying out communications using infrared rays, or the like.

<URL Information 5000>

Figure 20:
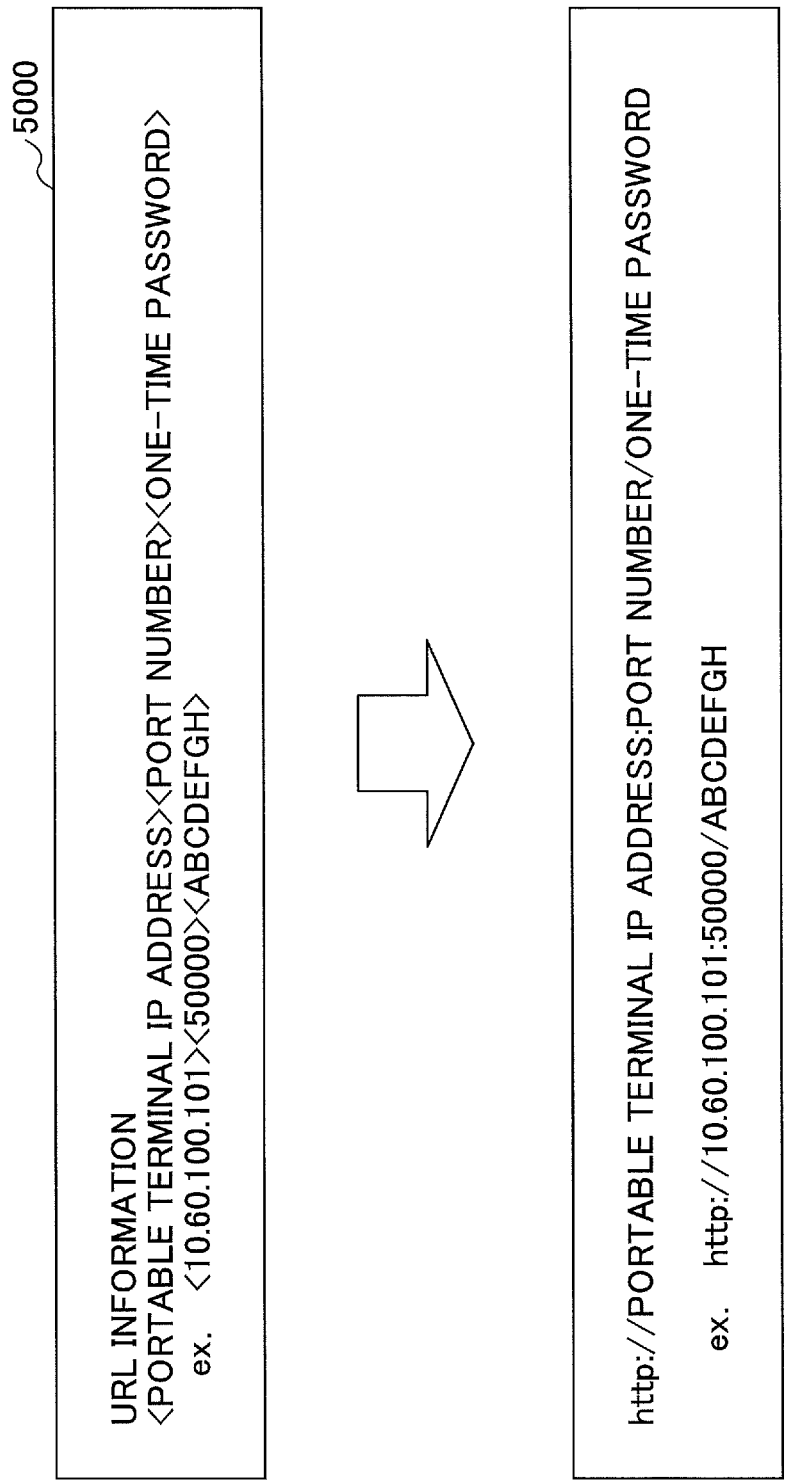
FIG. 20 illustrates one example of URL information and a URL.

With reference to FIG. 20, the URL information 5000 will now be described. FIG. 20 illustrates one example of the URL information and the URL. The URL information 5000 created by the server creation part 44 of the portable terminal 10 includes three items of information, i.e., the IP address of the portable terminal 10, a port number, and a one-time password.

The "IP address of the portable terminal 10" is an IP address fixed for the portable terminal 10 or given by a DHCP server. The IP address can be detected by a command such as, for example, "ipconfig", and is known by the portable terminal 10.

The "port number" is "PORT NUMBER OF SERVER OF PORTABLE TERMINAL" included in the second communications information 1300 transmitted by the image forming apparatus 20. The port number is the port number of a port of the portable terminal 10, at which the portable terminal 10 waits for communications from the image forming apparatus 20.

The "one-time password" is information for the portable terminal 10 to authenticate the image forming apparatus 20, and is changed each time the server creation part 44 creates the URL information 5000. The one-time password is, for example, a combination of alphanumeric characters determined randomly. In other words, the image forming apparatus 20 that designates the one-time password to connect to the portable terminal 10 is authenticated as being the image forming apparatus 20, to which the portable terminal 10 has transmitted the URL information 5000.

Thus, by using the URL information 5000, the image forming apparatus 20 can acquire information necessary to carry out communications with the server part 44a of the portable terminal 10, such as the IP address and the port number. The communications part (both the third communications part 351 and the fourth communications part 352) of the image forming apparatus 20 creates a URL according to the HTTP communications specifications, using the URL information 5000. Thus, the communications part 35 of the image forming apparatus 20 can carry out communications with the server part 44a created in the portable terminal 10. Note that, the server creation part 44 of the portable terminal 10 can transmit, instead of the URL information 5000, the URL itself, to the image forming apparatus 20.

Because the URL is an address, with which the image forming apparatus 20 carries out communications with the server part 44*a*, the portable terminal 10 can determine that the image forming apparatus 20 carries out communications using the URL information 5000, if the server part 44*a* and the image forming apparatus 20 carry out communications.

The URL information 5000 is transmitted from the portable terminal 10 to the image forming apparatus 20 for each of the networks N1 and N2 (each time the network is switched). The IP address depends on one fixed for the portable terminal 10 or given by the DHCP server. The port number depends on "PORT NUMBER OF SERVER OF PORTABLE TERMINAL" transmitted by the image forming apparatus 20. Therefore, The URL information 5000 can be fixed except for the one-time password. The reason why the URL information 5000 is transmitted each time the network is switched is that (i) the IP address included in the URL information 5000 may be changed as a result of the network being switched; (ii) the transmission is used as a trigger for the image forming apparatus 20 to start communications with the server part 44*a*; and (iii) the one-time password is to be transmitted.

Note that, among the URL information, the IP address of the portable terminal 10 can be transmitted as a host name instead of the IP address. In this case, the server creation part 44 previously registers, in a DNC (Domain Name System) server, the IP address of the portable terminal 10 (the URL not including the port number) and the host name in manner of associating with one another.

<Function of Server Part>

The functions of the server part 44*a* will now be described. First, a "server" means a service providing part (a computer or a device) that, in a network, provides a function(s), a service(s), data, or the like, to another computer. The service providing part is actually called a "server", a "server apparatus", or the like. The server part 44*a* according to the fourth embodiment operates as a server having this meaning. However, the server part 44*a* has a function to detect that the image forming apparatus 20 can connect to the portable terminal 10, and a function to acquire the address information of the image forming apparatus 20. The address information of the image forming apparatus 20 is information to be used to uniquely identify the image forming apparatus 20 in the network N1 or N2.

Specific examples of the address information of the image forming apparatus 20 include a URI, a URL, a host name, an IP address, and so forth, of the image forming apparatus 20. Concerning the fourth embodiment, the description will be made using the "IP address" as one example of the address information.

Figure 21:
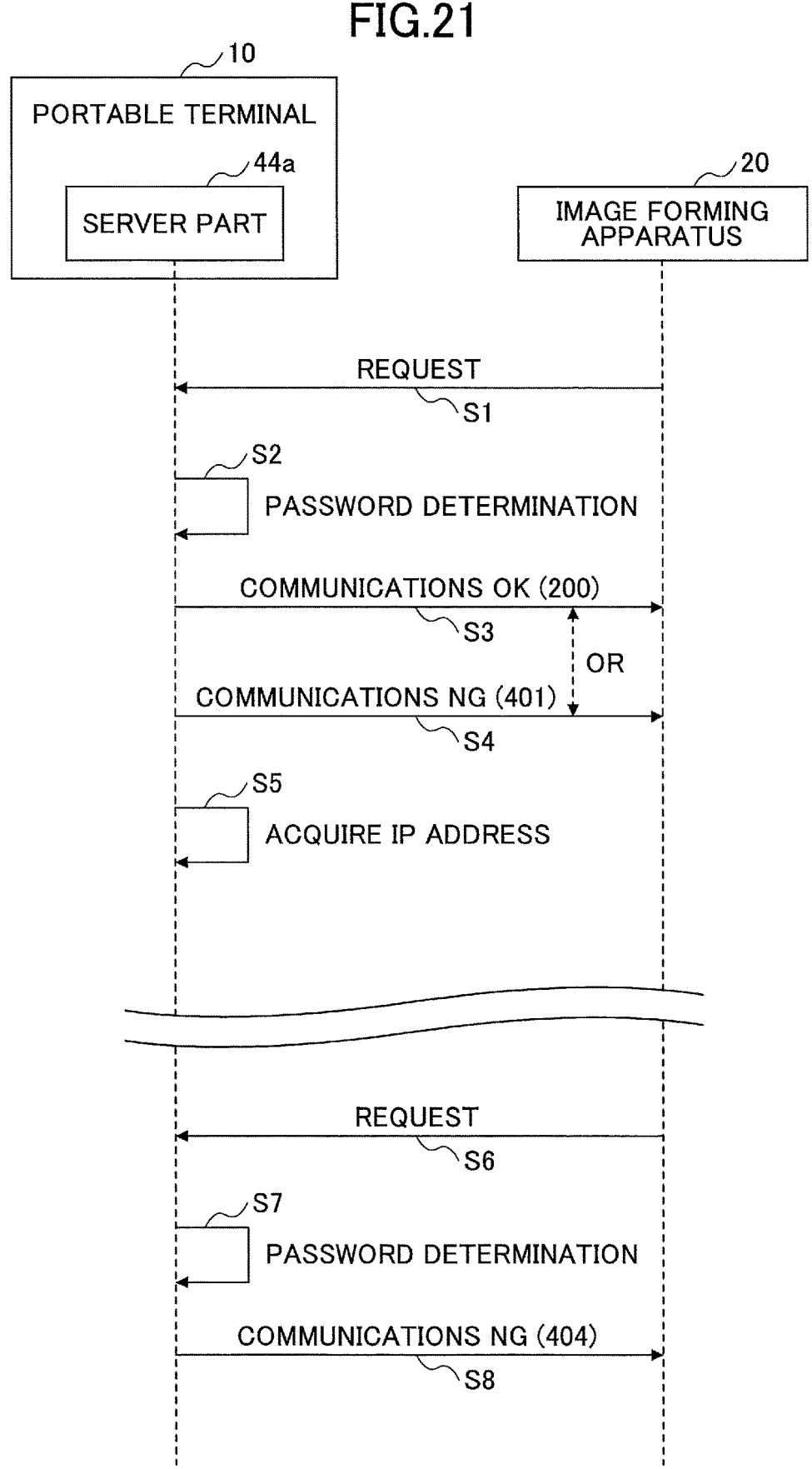
FIG. 21 is a sequence diagram of one example of functions of a server part.

FIG. 21 is a sequence diagram of one example of functions of the server part 44*a*. FIG. 21 illustrates a process to be carried out after the URL information 5000 is transmitted to the image forming apparatus 20.

Step S1: As mentioned above, as a result of the portable terminal 10 having the server part 44*a*, the image forming apparatus 20 can access the portable terminal 10 using a request for HTTP communications, or the like, which designates the URL.

Step S2: The server part 44*a* acquires a password transmitted for the above-mentioned URL, and determines whether the password is coincident with the password included in the URL information 5000.

Step S3: If they are coincident, the server part 44*a* transmits information "communications OK" (a status code 200) to the image forming apparatus 20 via the first communications part 151 or the second communications part 152. The information "communications OK" (the status code 200) denotes that communications succeeds.

Step S4: In contrast, if the passwords are not coincident, the server part 44*a* transmits information "communications NG" (a status code 401) to the image forming apparatus 20 via the first communications part 151 or the second communications part 152. The information "communications NG" (the status code 401) denotes that authentication is failed ("Unauthorized"). The status code 401 can be another status code of 400*s*.

Step S5: The server part 44*a* acquires the IP address of the image forming apparatus 20. As a result of the first communications part 151 or the second communications part 152 receiving the request, it can acquire the IP address of the image forming apparatus 20 included in the IP header that is transmitted/received through the TCP/IP layer.

Steps S6 through S8: The image forming apparatus 20 repetitiously transmits the HTTP communications request to the server part 44*a* (until the image forming apparatus 2 receives the information "communications OK", because the image forming apparatus 2 cannot determine that the request of step S1 has been received by the server part 44*a*). The created server part 44*a* returns the information "communications OK" only to the first request received after the creation of the server part 44*a*, and returns the information "communications NG" (the status code 404) to the second or more request even if the passwords are coincident. The status code 404 denotes that the requested resource has not been found ("Not Found"). Another status code of 400*s* can be created for the second or more request.

As a result of the information "communications NG" being returned to the second or more request, the portable terminal 10 can be prevented from erroneously determining an apparatus other than the image forming apparatus 20 as the image forming apparatus 20 even if the portable terminal 10 receives the request from the other apparatus.

Thus, by creating the server part 44*a*, the portable terminal 10 can acquire the IP address of the image forming apparatus 20 even if the portable terminal 10 does not acquire the IP address of the image forming apparatus 20 from the image forming apparatus 20 through BLE or the like.

<Process Detail>

Next, the process of the printing system 1 according to the fourth embodiment will be described in detail.

<<Overall Operation>>

Figure 22:
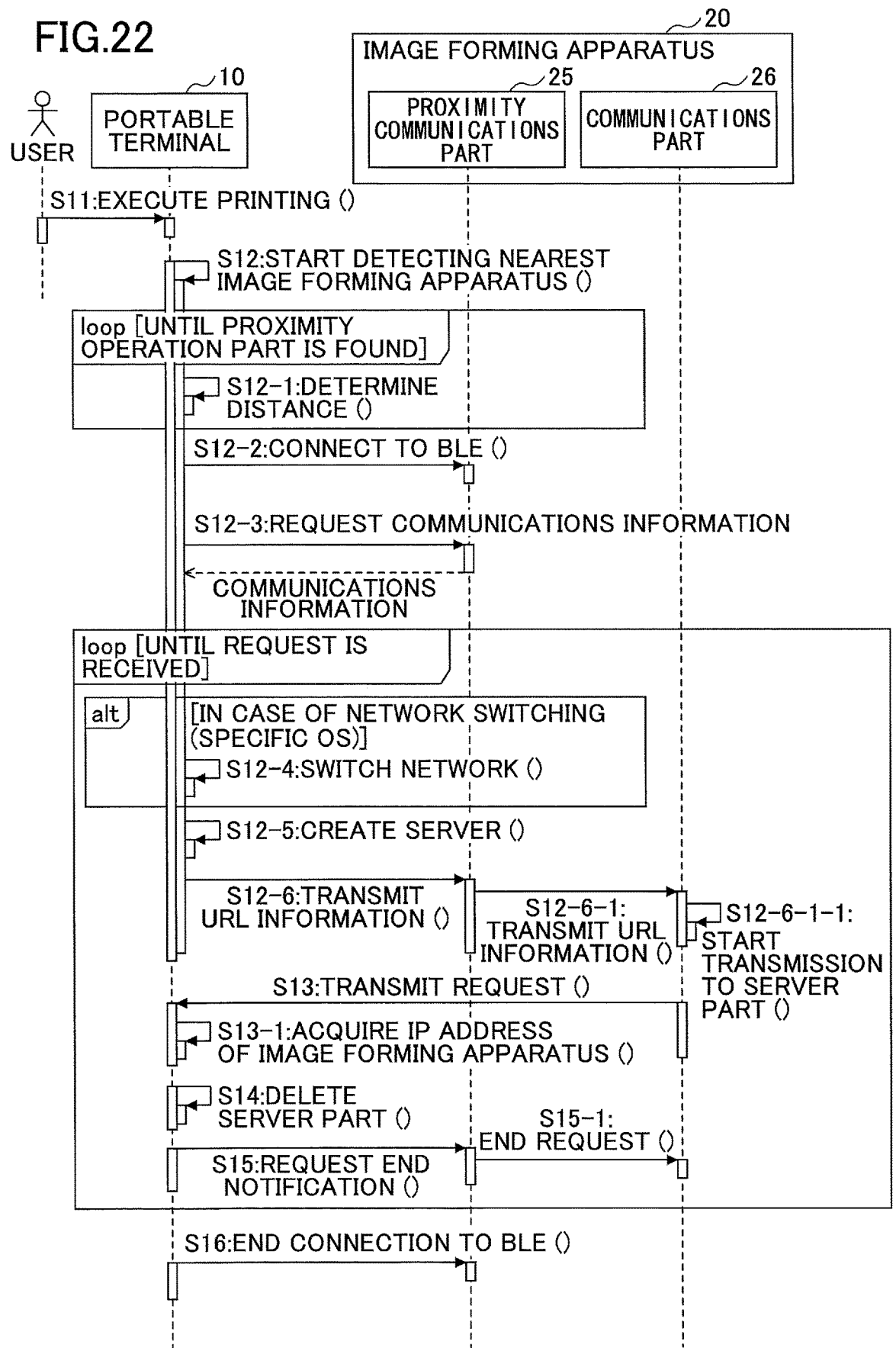
FIG. 22 is a sequence diagram of one example of a printing process to acquire an IP address of an image forming apparatus (the fourth embodiment)

With reference to FIG. 22, a flow of a printing process of the printing system 1 according to the fourth embodiment will now be described. FIG. 22 is a sequence diagram of one example of the printing process for acquiring the IP address of the image forming apparatus 20 according to the fourth embodiment.

Step S11: The user operates a screen page displayed on the UI display part 14 of the portable terminal 10 to input an instruction to carry out printing. The operation reception part 17 of the portable terminal 10 receives the instruction to carry out printing. The user then selects desired print target data from the application installed in the portable terminal 10, and inputs an instruction to print it. As a result, a print job including the print target data thus selected by the user is generated. In response to the printing instruction being thus input, the print condition screen page 901 of FIG. 11A is displayed on the display unit 102 of the portable terminal 10.

Step S12: The user follows a guidance written in the screen page, and holds and moves the portable terminal 10 closer to the short-range wireless communications unit 301 of the image forming apparatus 20. According to BLE, devices can carry out communications within a distance therebetween on the order of several meters. However, because a plurality of the image forming apparatuses 20 may be placed nearby, the portable terminal 10 detects that the user intentionally holds and moves the portable terminal 10 closer to the image forming apparatus 20 within a predetermined distance. Actually, the proximity communications part 41 of the portable terminal 10 detects that the portable terminal 10 approaches the image forming apparatus 20 nearer than 10 through 50 cm, or so. This distance can be set by the user.

The distance detection will now be described. The image forming apparatus 20 transmits advertise packets within a range (several meters) where communications is available using BLE. The advertise packets include an output of the short-range wireless communications unit 301. The short-range wireless communications unit 109 detects the radio field intensity when receiving BLE electric waves (i.e., "received radio field intensity"). The proximity communications part 41 of the portable terminal 10 converts the difference or the ratio between the output and the received radio field intensity to the distance using a predetermined conversion formula or table. Thus, the proximity communications part 41 of the portable terminal 10 can detect the distance from the image forming apparatus 20.

The proximity communications part 41 can start communications with the image forming apparatus 20 also without determining that the distance is within the range.

Step S12-1: The proximity communications part 41 of the portable terminal 10 starts receiving electric waves as a result of approaching the image forming apparatus 20 within several meters, or so, and further repeats detection of the distance to the image forming apparatus 20 until approaching within a predetermined distance.

Step S12-2: After the proximity communications part 41 of the portable terminal 10 determines that it approaches the image forming apparatus 20 within the predetermined distance, the proximity communications part 41 starts communications with the image forming apparatus 20 (declares to start communications). Thus, the proximity communications part 41 of the portable terminal 10 connects to the BLE network.

Step S12-3: Then, the proximity communications part 41 of the portable terminal 10 requests the communications information 1000 from the image forming apparatus 20 via the BLE network. Actually, by designating a "characteristic" that requests the communications information 1000, the proximity communications part 41 requests the communications information 1000. The proximity communications part 36 of the image forming apparatus 20 receives the request for the communications information 1000, reads the communications information 1000 from the communications information DB 31, and transmits it to the portable terminal 10. The proximity communications part 41 of the portable terminal 10 stores the received communications information 1000 in the information storage part 16.

The following steps S12-4 through S15-1 are carried out by the portable terminal 10 to acquire the IP address of the image forming apparatus 20 concerning the network N1 and the IP address of the image forming apparatus 20 concerning the network N2 (the process is repeated for the number of networks).

Step S12-4: The network switching part 43 switches the network, to which the portable terminal 10 currently connects, to the network N1. This process needs not be carried out if the portable terminal 10 has already connected to the network N1.

Step S12-5: As a result of the portable terminal 10 connecting to the BLE network, the server creation part 44 of the portable terminal 10 creates the server part 44*a*. Also, the server creation part 44 creates the URL information 5000 using the communications information 1000 acquired from the image forming apparatus 20. In this regard, the IP address of the portable terminal 10 is known, "PORT NUMBER OF SERVER OF PORTABLE TERMINAL" is described in the second communications information 1300, and a one-time password can be freely created.

Step S12-6: The proximity communications part 41 of the portable terminal 10 transmits the URL information 5000 to the image forming apparatus 20 via the BLE network. Actually, by designating a "characteristic" to be used for transmitting the URL information 5000 and storing the URL information 5000 therein, the proximity communications part 41 transmits the URL information 5000.

It is preferable that the proximity communications part 41 previously encrypts the URL information 5000. For this purpose, a fixed value that is previously set in the program 108*a* of the portable terminal 10 and the programs 215*a* of the image forming apparatus 20 can be used. Alternatively, the fixed value can be exchanged therebetween when the BLE communications in step S12-2 is started.

If the proximity communications part 36 of the image forming apparatus 20 receives a "characteristic" not present in the image forming apparatus 20, the proximity communications part 3 detects an error, and does not carry out the process thereafter.

After the portable terminal 10 thus transmits the URL information 5000, the under-connection screen page 911 of FIG. 11B is displayed on the display unit 102 of the portable terminal 10.

Step S12-6-1-1: The communication part 35 of the image forming apparatus 20 uses the URL information 5000 to create the URL as shown in FIG. 20. In response to thus acquiring the URL information 5000, the communication part 35 of the image forming apparatus 20 tries communications with the server part 44*a* of the portable terminal 10 via the network N1. It is assumed that the third communications part 351 of the image forming apparatus 20 has already connected to the network N1. Also, It is assumed that the fourth communications part 352 of the image forming apparatus 20 has already connected to the network N2, or there is no problem for the fourth communications part 352 to connect to the network N2.

Step S13: During a predetermined waiting period of time after the proximity communications part 41 transmitted the URL information 5000, the server part 44*a* of the portable terminal 10 waits for a HTTP communications request. The waiting period of time is, for example, several seconds. However, it is not necessary to be limited thereto. It is preferable that the user can set it from a screen page. The third communications part 351 of the image forming apparatus 20 designates the IP address and the port number of the server part 44*a* in the URL, and transmits the HTTP communications request. The HTTP communications request includes the one-time password. Various "methods" can be used for the HTTP communications request. For example, POST, GET, or the like, is used. According to the fourth embodiment, any "method" can be used. This is because, the HTTP communications request is transmitted for the image forming apparatus 20 to send the IP address of the image forming apparatus 20 to the portable terminal 10. What is necessary is that an IP protocol is used for transmitting an IP address. Thus, a communications protocol higher than an IP protocol is not limited to HTTP communications. For example, HTTPS, HTTP/2, FTP (File Transfer Protocol), or the like, can be used. Also, UDP can be used instead of TCP.

If the third communications part 351 of the image forming apparatus 20 transmits the HTTP communications request, the first communications part 151 of the portable terminal 10 receives the HTTP communications request, and transmits it to the server part 44a. As mentioned above, if the one-time passwords agree, the server part 44a returns a response of the status code 200 in response to the first request after the URL information 5000 is transmitted. The server part 44a returns a response of the status code 404 for the second or more request. This is because, if the status code is not "200", the image forming apparatus 20 cannot determine that the portable terminal 10 has received the request, and therefore, the image forming apparatus 20 repetitiously transmits the request of step S13.

Step S13-1: The server part 44a of the portable terminal 10 can acquire the IP address of the image forming apparatus 20 (the IP address of the first communications information 1100 according to the first through the third embodiments, not included in the communications information 1000 according to the fourth embodiment). The server part 44a of the portable terminal 10 stores the IP address of the image forming apparatus 20 in the information storage part 16.

Step S14: Because the server part 44a can thus have acquired the IP address of the image forming apparatus 20, the server part 44a becomes no longer necessary, and therefore, the server creation part 44 deletes the server part 44a.

Step S15: Also, because the server part 44a can thus have acquired the IP address of the image forming apparatus 20, the image forming apparatus 20 no longer needs to transmit the request. Therefore, the proximity communications part 41 of the portable terminal 10 transmits a request end notification to the image forming apparatus 20. Actually, the proximity communications part 41 writes a predetermined value (=0) in a "characteristic" that is used to send information indicating the end of the request.

Step S15-1: The proximity communications part 36 of the image forming apparatus 20 acquires the request end notification, and causes the third communications part 351 to end transmitting the request.

Then, again the process is carried out from step S12-4. Thus, the portable terminal 10 switches the network N1, to which the portable terminal 10 itself connects, to the network N2, and carries out steps S12-5 through S15-1. Thus, the URL information of a second time is transmitted to the image forming apparatus 20. Therefore, the server part 44a of the portable terminal 10 can acquire the IP address of the image forming apparatus 20 (the IP address of the second communications information 1300 in the first through third embodiments, not included in the communications information 1000 according to the fourth embodiment).

Step S16: The proximity communications part 41 of the portable terminal 10 ends the BLE communications (declares communications end). Thereby, the portable terminal 10 comes to not connect to the BLE network.

<<Authentication>>

Thus, the communications information 1000 equivalent to one according to the first through third embodiments including the IP address can be acquired. Thus, the portable terminal 10 is authenticated, and determines whether a connection can be carried out, in the same way as the first embodiment.

Figure 23:
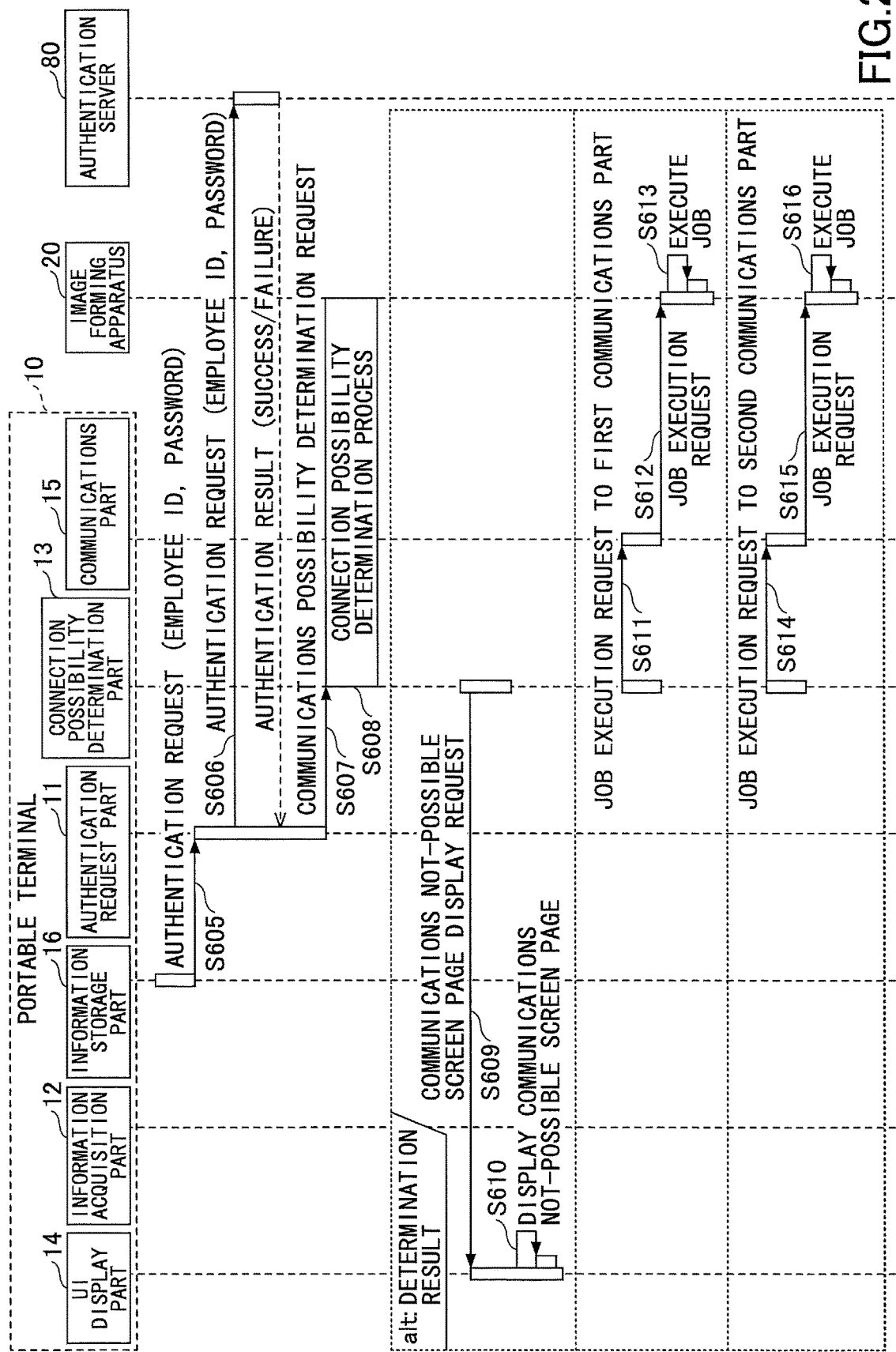
FIG. 23 is a sequence diagram of one example of a printing process (the fourth embodiment).

FIG. 23 is a sequence diagram of one example of a printing process according to the fourth embodiment. The process of FIG. 23 is carried out subsequent to FIG. 22. Note that, concerning FIG. 23, the differences from FIG. 9 will be described mainly.

Through the process of FIG. 22, the information storage part 16 stores the communications information including the IP addresses. In step S605, the authentication request part 11 of the portable terminal 10 reads the employee ID and the password from the information storage part 16.

In step S606, the authentication request part 11 of the portable terminal 10 uses the authentication connection information 900 included in the communications information 1000 to connect to the authentication server 80, and transmits thereto an authentication request together with the authentication information (the employee ID and the password). Thus, the authentication request part 11 acquires the authentication result (success or failure) from the authentication server 80.

In step S607, the authentication request part 11 of the portable terminal 10 transmits a determination request to the connection possibility determination part 13 to determine which one of the plurality of sets of communications information included in the communications information 1000 is to be used to carry out communications with the image forming apparatus 20.

In step S608, the connection possibility determination part 13 of the portable terminal 10 then carries out the connection possibility determination process. The connection possibility determination process can be the same as one in the first embodiment.

Thereafter, the process of FIG. 10 is carried out. In FIG. 10, communications is tried using the first communications information 1100 in step S703. At this time, the 12 address is not included the first communications information 1100 of in the fourth embodiment. Therefore, the IP address of the image forming apparatus 20 acquired for the first time in step S13-1 of FIG. 22 is used. In the same way, in step S707, communications is tried using the second communications information 1300. In step S707, the network switching part 43 of the portable terminal 10 switches the network N1, to which the portable terminal 10 is currently connected, to the network N2. At this time, because the second communications information 1300 of the fourth embodiment does not include the IP address, the IP address of the image forming apparatus 20 acquired for the second time in step S13-1 of FIG. 22 is used.

Thus, also in the fourth embodiment, it is determined whether the first communications part 151 or the second communications part 152 is to be used to carry out communications. Then, either the first communications part 151 or the second communications part 152 carries out communications with the image forming apparatus 20, and requests it to execute the job.

As described above, in the printing system 1 according to the fourth embodiment, the server part 44a is created in the portable terminal 10. Thus, the portable terminal 10 can acquire the IP address of the image forming apparatus 20. The portable terminal 10 can be authenticated by the authentication server 80 using the communications information 1000 acquired through BLE, and request the image forming apparatus 20 to execute the job using the IP address of the image forming apparatus 20 that the server part 44a acquires. Therefore, the user's work to set the first communications information 1100 and the second communications information 1300 for the image forming apparatus 20 connected to the plurality of networks can be reduced, and also, each user can automatically select the proper network.

Other Application Examples

Thus, the non-transitory computer-readable information recording media, the information processing apparatuses, and the communications systems have been described in the embodiments. However, application of the present disclosure is not limited to the embodiments, and various modifications and replacements can be made.

Note that, the image forming apparatus 20 is one example of an "apparatus"; the portable terminal 10 is one example of an "information processing apparatus"; the network N1 is one example of a "first network"; the network N2 is one example of a "third network"; and the network, to which the portable terminal 10 is connected before being connected to the network N1, is one example of a "second network". The operation reception part 17 is one example of an identification information reception part; the information acquisition part 12 is one example of an "acquisition part"; the connection possibility determination part 13 is one example of a "determination part"; the communications switching control part 18 is one example of a "communications switching control part"; and the communication part 15 is one example of a "requesting part". The authentication request part 11 is one example of an "authentication result acquisition part"; the authentication server 80 is one example of an "authentication unit"; and the information storage part 16 is one example of an "information storage part".

According to the embodiments, it is possible to provide a program configured to, when a terminal or the like transmits a request to an apparatus which is connectable to a plurality of networks, connect to a proper one of the plurality of networks.

What is claimed is:

1. A non-transitory computer-readable information recording medium storing a program, the program being configured to cause at least one processor installed in an information processing apparatus to:
   receive identification information of a user;
   acquire a plurality of sets of communications information that includes a first set of communications information to be used to connect to an apparatus to carry out a process via a first network of a plurality of networks and a second set of communications information to be used to connect to the apparatus via a second network of the plurality of networks, the apparatus being connectable to the plurality of networks;
   transmit an authentication request to an authentication server via one network of the plurality of networks, wherein the one network includes the first network;
   receive a result of authentication from the authentication server via the one network, wherein the authentication is performed by the authentication server using the identification information of the user, the identification information of the user being different from identification of a network,
   determine whether to connect to the apparatus via the first network or to connect to the apparatus via the second network based on whether the result of the authentication indicates successful authentication,
   connect to the first network of the networks, using the first set of communication information, in response to determining to connect to the apparatus via the first network, and
   connect to the second network of the networks, using the second set of communication information, in response to determining to connect to the apparatus via the second network.

2. The non-transitory computer-readable information recording medium as claimed in claim 1, wherein
   the program further causes the at least one processor to
   attempt to wirelessly connect to the apparatus via the first network using the first set of communications information in response to determining to connect to the first network, and
   attempt to wirelessly connect to the apparatus via the second network using the second set of the communications information in response to determining to connect to the second network.

3. The non-transitory computer-readable information recording medium as claimed in claim 2, wherein
   the program further causes the at least one processor to
   attempt to request, using the second set of communications information, the apparatus to carry out the process, if the at least one processor determines that it is not possible to request, using the first set of communications information, the apparatus to carry out the process.

4. The non-transitory computer-readable information recording medium as claimed in claim 2, wherein
   the respective sets of communications information have priority settings, the first set of communications information has the propriety setting greater than or equal to a threshold, and the second set of communications information has the propriety setting less than the threshold.

5. The non-transitory computer-readable information recording medium as claimed in claim 2, wherein
   at least one of the sets of communications information includes a setting as to whether to permit a connection, and
   the program further causes the at least one processor to
   attempt to connect to the apparatus using only one of the at least one of the sets of the communications information including the setting to permit a connection to the apparatus.

6. The non-transitory computer-readable information recording medium as claimed in claim 2, wherein
   the program further causes the at least one processor to
   acquire the sets of communications information from a NFC tag placed at or near the apparatus via short-range wireless communications.

7. The non-transitory computer-readable information recording medium as claimed in claim 1, wherein the apparatus includes an image forming apparatus.

8. The non-transitory computer-readable information recording medium as claimed in claim 1, wherein each set of the communications information includes Service Set Identifier and IP address.

9. The non-transitory computer-readable information recording medium as claimed in claim 1, wherein the first set of communications information includes identification information for identifying the first network, and the program further causes the at least one processor to
   determine whether a network is to be switched based on the identification information,
   wherein, upon determining that the network is to be switched, the program causes the at least one processor to switch the network from the second network to the first network.

10. The non-transitory computer-readable information recording medium as claimed in claim 1, wherein a communications environment of the first network has higher security than a communications environment of the second network by encrypting the first set of communications information.

11. An information processing apparatus comprising at least one processor, the at least one processor being configured to receive identification information of a user;

acquire a plurality of sets of communications information that includes a first set of communications information to be used to connect to an apparatus to carry out a process via a first network of a plurality of networks and a second set of communications information to be used to connect to the apparatus via a second network of the plurality of networks, the apparatus being connectable to the plurality of networks;

transmit an authentication request to an authentication server via one network of the plurality of networks, wherein the one network includes the first network;

receive a result of authentication from the authentication server via the one network, wherein the authentication is performed by the authentication server using the identification information of the user, the identification information of the user being different from identification of a network, determine whether to connect to the apparatus via the first network or to connect to the apparatus via the second network based on whether the result of the authentication indicates successful authentication, connect to the first network of the networks, using the first set of communication information, in response to determining to connect to the apparatus via the first network, and connect to the second network of the networks, using the second set of communication information, in response to determining to connect to the apparatus via the second network.

12. The information processing apparatus according to claim 11, wherein a communications environment of the first network has higher security than a communications environment of the second network by encrypting the first set of communications information.

13. A communications system comprising an apparatus connectable to a plurality of networks and an information processing apparatus, the communications system comprising at least one processor, the at least one processor being configured to receive identification information of a user;

acquire a plurality of sets of communications information that includes a first set of communications information to be used to connect to the apparatus to carry out a process via a first network of a plurality of networks and a second set of communications information to be used to connect to the apparatus via a second network of the plurality of networks, the apparatus being connectable to the plurality of networks;

transmit an authentication request to an authentication server via one network of the plurality of networks, wherein the one network includes the first network;

receive a result of authentication from the authentication server via the one network, wherein the authentication is performed by the authentication server using the identification information of the user, the identification information of the user being different from identification of a network;

determine whether to connect to the apparatus via the first network or to connect to the apparatus via the second network based on whether the result of the authentication indicates successful authentication;

connect to the first network of the networks, using the first set of communication information, in response to determining to connect to the apparatus via the first network; and connect to the second network of the networks, using the second set of communication information, in response to determining to connect to the apparatus via the second network.

14. The communications system according to claim 13, wherein a communications environment of the first network has higher security than a communications environment of the second network by encrypting the first set of communications information.

* * * * *